(12) United States Patent
Shinkawa et al.

(10) Patent No.: US 12,554,123 B2
(45) Date of Patent: Feb. 17, 2026

(54) MOVABLE DEVICE, IMAGE PROJECTION APPARATUS, LASER HEADLAMP, HEAD-MOUNTED DISPLAY, DISTANCE MEASUREMENT DEVICE, AND MOBILE OBJECT

(71) Applicants: Mizuki Shinkawa, Kanagawa (JP); Goichi Akanuma, Kanagawa (JP)

(72) Inventors: Mizuki Shinkawa, Kanagawa (JP); Goichi Akanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 958 days.

(21) Appl. No.: 17/652,759

(22) Filed: Feb. 28, 2022

(65) Prior Publication Data

US 2022/0299757 A1 Sep. 22, 2022

(30) Foreign Application Priority Data

Mar. 17, 2021 (JP) ................. 2021-043779

(51) Int. Cl.
*G02B 26/08* (2006.01)
*F21S 41/16* (2018.01)
*F21S 41/176* (2018.01)
*F21S 41/675* (2018.01)
*G01S 7/481* (2006.01)
*G01S 17/88* (2006.01)
(Continued)

(52) U.S. Cl.
CPC .......... *G02B 26/0858* (2013.01); *F21S 41/16* (2018.01); *F21S 41/176* (2018.01); *F21S 41/675* (2018.01); *G01S 7/4817* (2013.01); *G01S 17/88* (2013.01); *G02B 26/101* (2013.01); *G02B 27/0101* (2013.01); *G02B 27/0172* (2013.01); *G03B 21/008* (2013.01); *G03B 21/2013* (2013.01); *G01S 7/4813* (2013.01); *G02B 2027/0178* (2013.01)

(58) Field of Classification Search
CPC .............. G02B 26/0858; G02B 26/101; G02B 27/0101; G02B 27/0172; G02B 2027/0178; G01S 7/4813; G01S 17/88; G03B 21/008; G03B 21/2013; F21S 41/176; F21S 41/675
See application file for complete search history.

(56) References Cited

U.S. PATENT DOCUMENTS 6,177,667 B1 1/2001 Fujita et al.
9,759,909 B1 * 9/2017 Tauscher ............ G02B 26/0841
(Continued)

FOREIGN PATENT DOCUMENTS

JP 2010-060688 3/2010
JP 2011-209583 10/2011
(Continued)

OTHER PUBLICATIONS

Japanese Office Action for 2021-043779 mailed on Jul. 30, 2024.

*Primary Examiner* — Georgia Y Epps
*Assistant Examiner* — Don J Williams
(74) *Attorney, Agent, or Firm* — IPUSA, PLLC

(57) ABSTRACT

A movable device includes a movable portion; a drive unit having one end connected to the movable portion to rotate the movable portion; a support supporting the drive unit; a connecting portion having one end connected to the support to support the support; and a stationary support to which the other end of the connecting portion is connected.

20 Claims, 23 Drawing Sheets

(51) Int. Cl.
　　　*G02B 26/10*　　　(2006.01)
　　　*G02B 27/01*　　　(2006.01)
　　　*G03B 21/00*　　　(2006.01)
　　　*G03B 21/20*　　　(2006.01)

(56) References Cited

U.S. PATENT DOCUMENTS

| | | |
|---|---|---|
| 11,119,311 B2 * | 9/2021 | Yamada ................ G02B 26/10 |
| 2003/0234990 A1 | 12/2003 | Akanuma |
| 2011/0234619 A1 * | 9/2011 | Tokunaga ............ G02B 27/104 |
| | | 345/589 |
| 2012/0120470 A1 | 5/2012 | Kitazawa et al. |
| 2013/0050791 A1 | 2/2013 | Nakazono et al. |
| 2014/0355089 A1 | 12/2014 | Murayama et al. |
| 2014/0375898 A1 * | 12/2014 | Kurozuka ............ G02B 26/101 |
| | | 359/213.1 |
| 2016/0109697 A1 | 4/2016 | Nakagawa et al. |
| 2016/0139404 A1 | 5/2016 | Akanuma |
| 2020/0183151 A1 | 6/2020 | Nanjyo et al. |
| 2020/0371345 A1 * | 11/2020 | Mochida ............ G02B 26/101 |
| 2021/0041687 A1 | 2/2021 | Yokota et al. |
| 2021/0058592 A1 | 2/2021 | Akanuma |
| 2021/0156964 A1 | 5/2021 | Akanuma et al. |
| 2021/0157128 A1 | 5/2021 | Akanuma |
| 2021/0157129 A1 | 5/2021 | Yoda et al. |
| 2021/0286167 A1 | 9/2021 | Shinkawa |

FOREIGN PATENT DOCUMENTS

| | | |
|---|---|---|
| JP | 2012-123364 | 6/2012 |
| JP | 2013-007779 | 1/2013 |
| JP | 2013-160887 | 8/2013 |
| JP | 2016-081037 | 5/2016 |
| JP | 2019-082634 | 5/2019 |

* cited by examiner

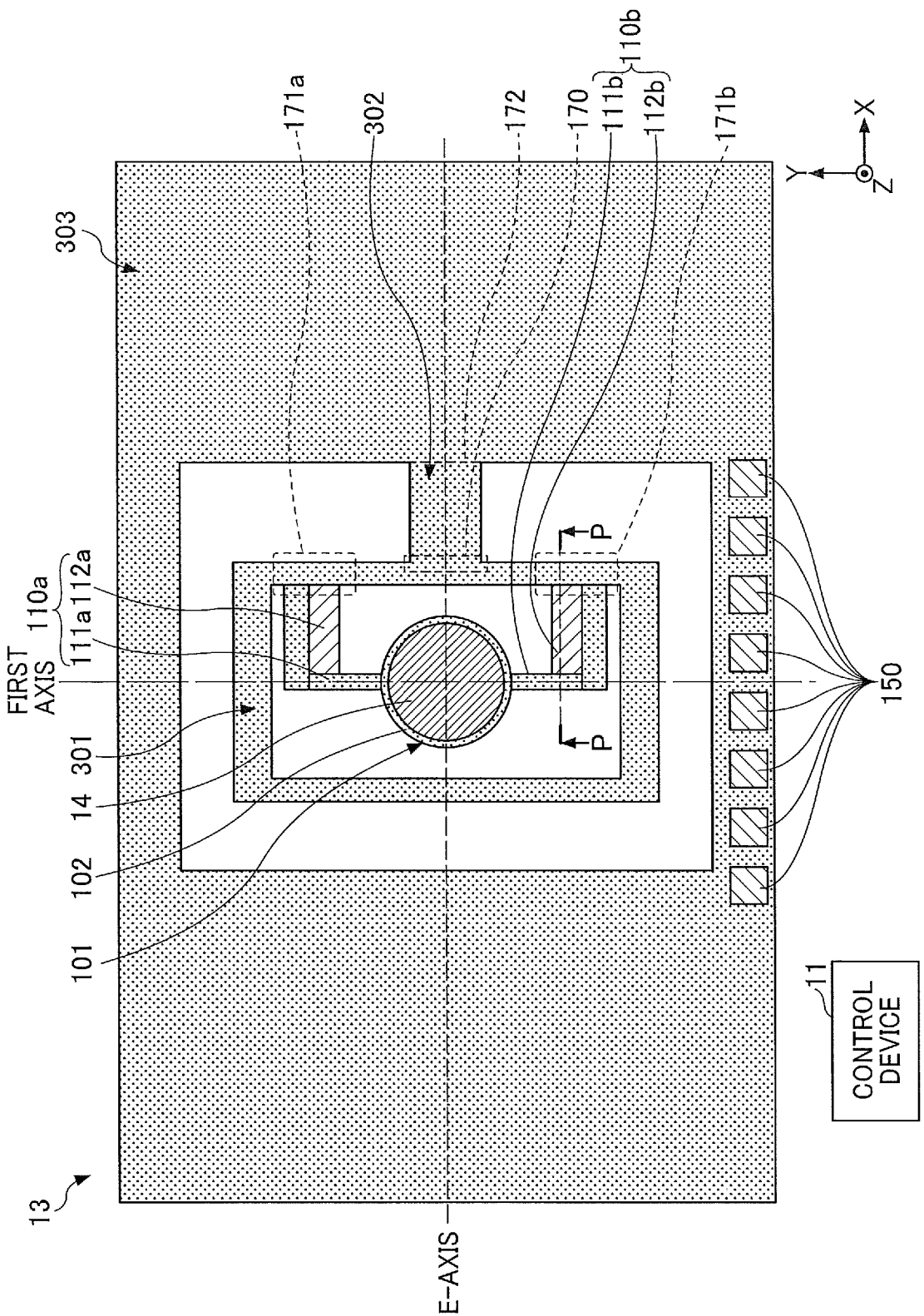

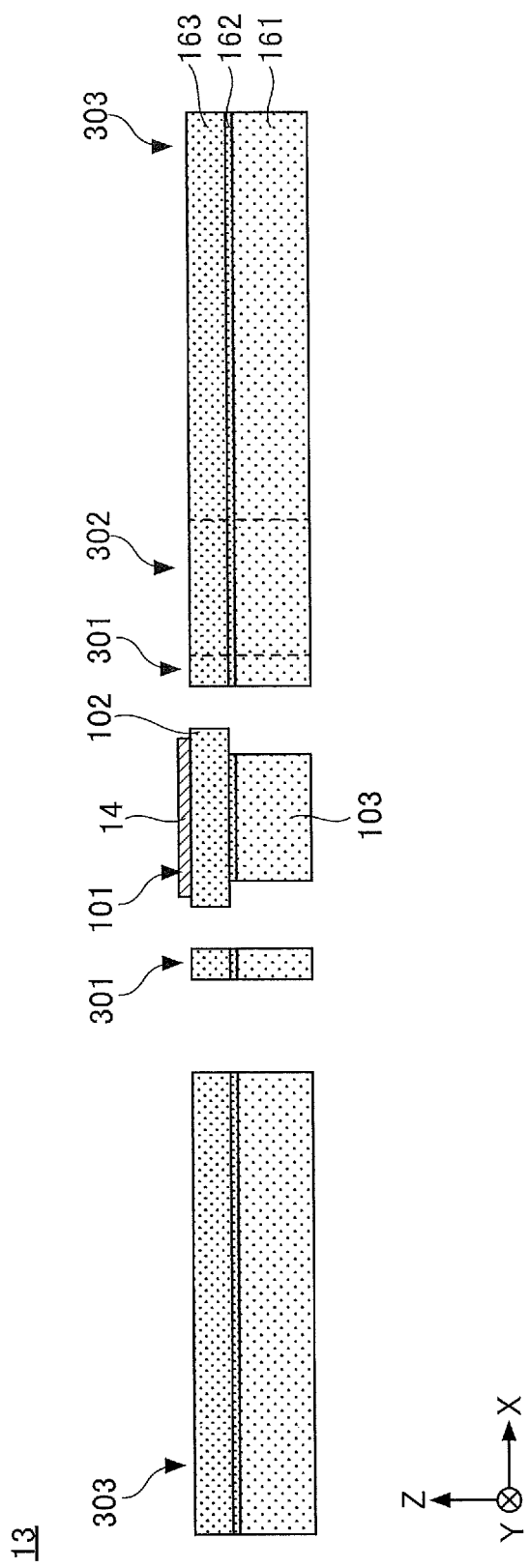
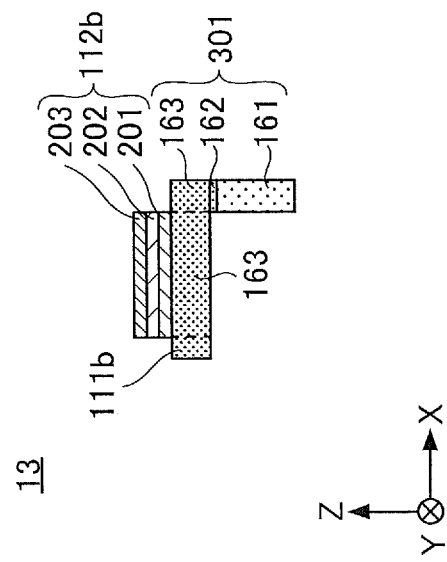

FIG. 5A COMPARATIVE EXAMPLE
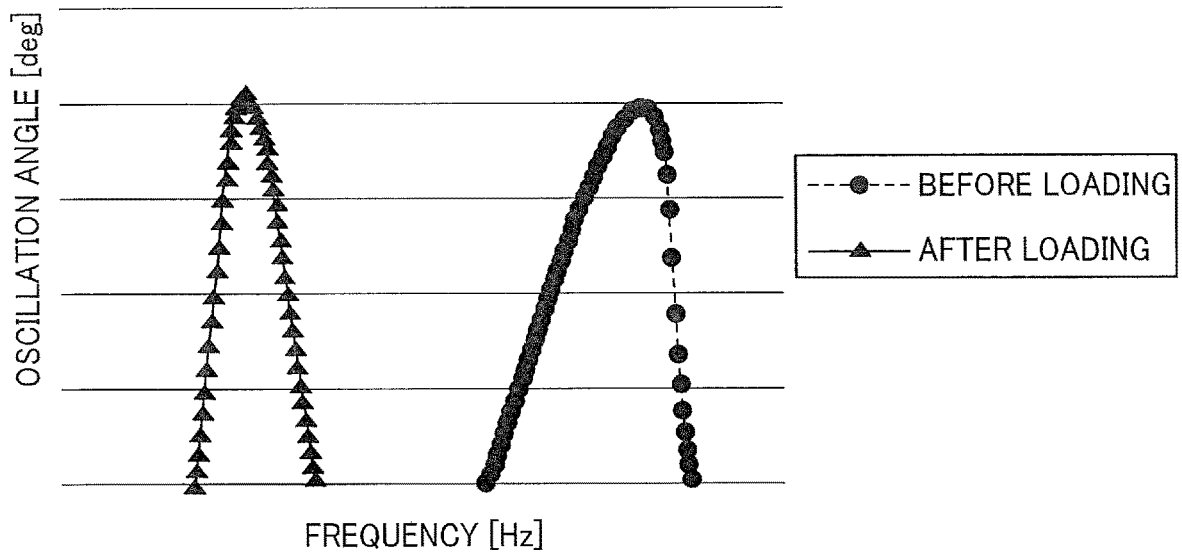
FIG. 5B
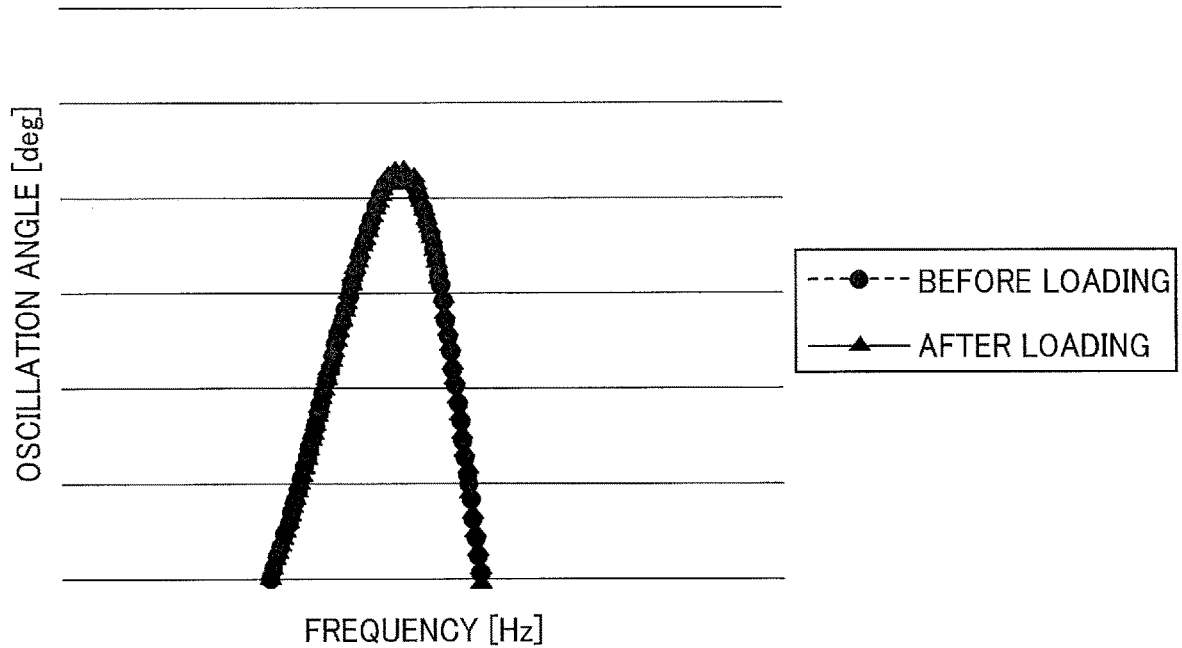

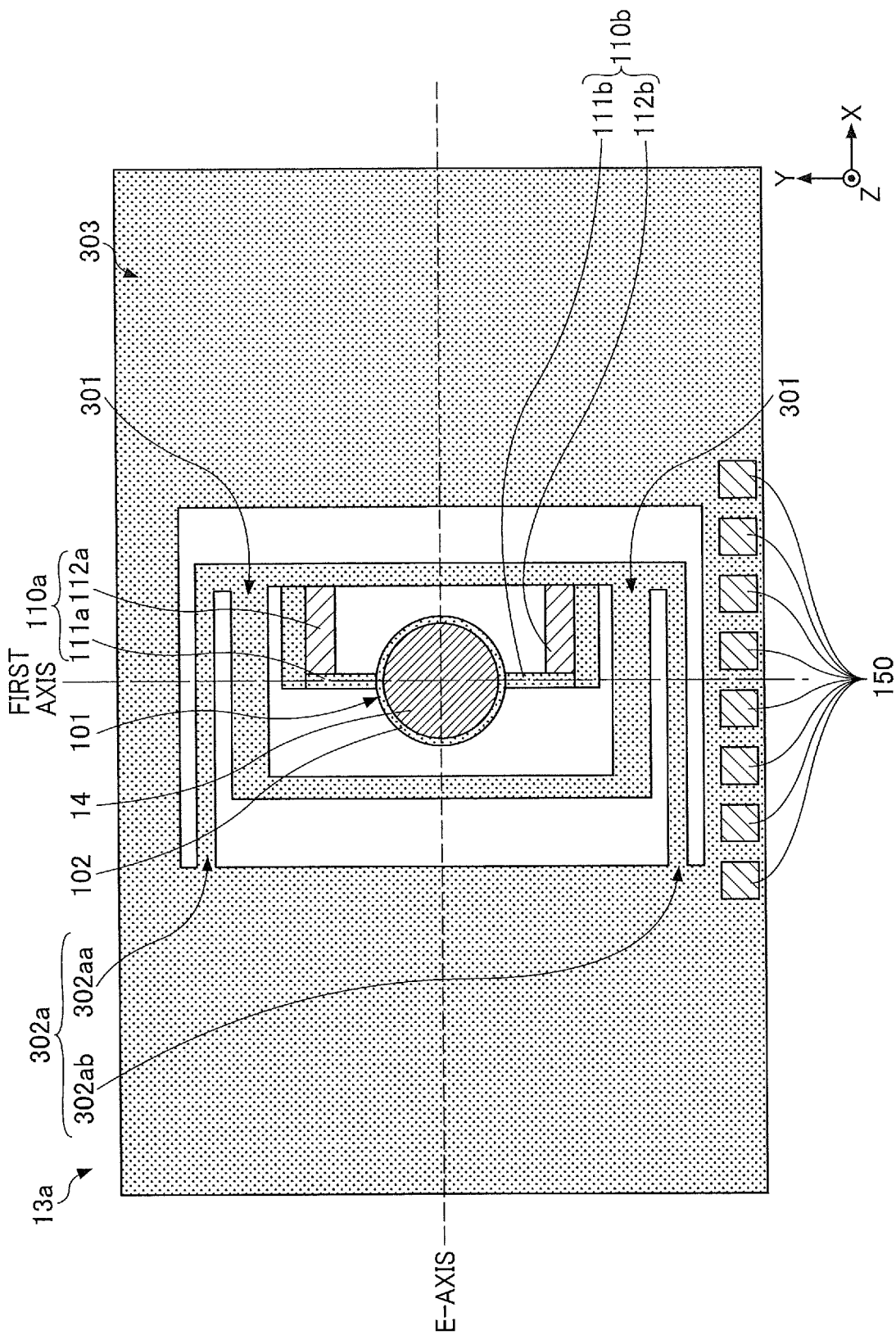

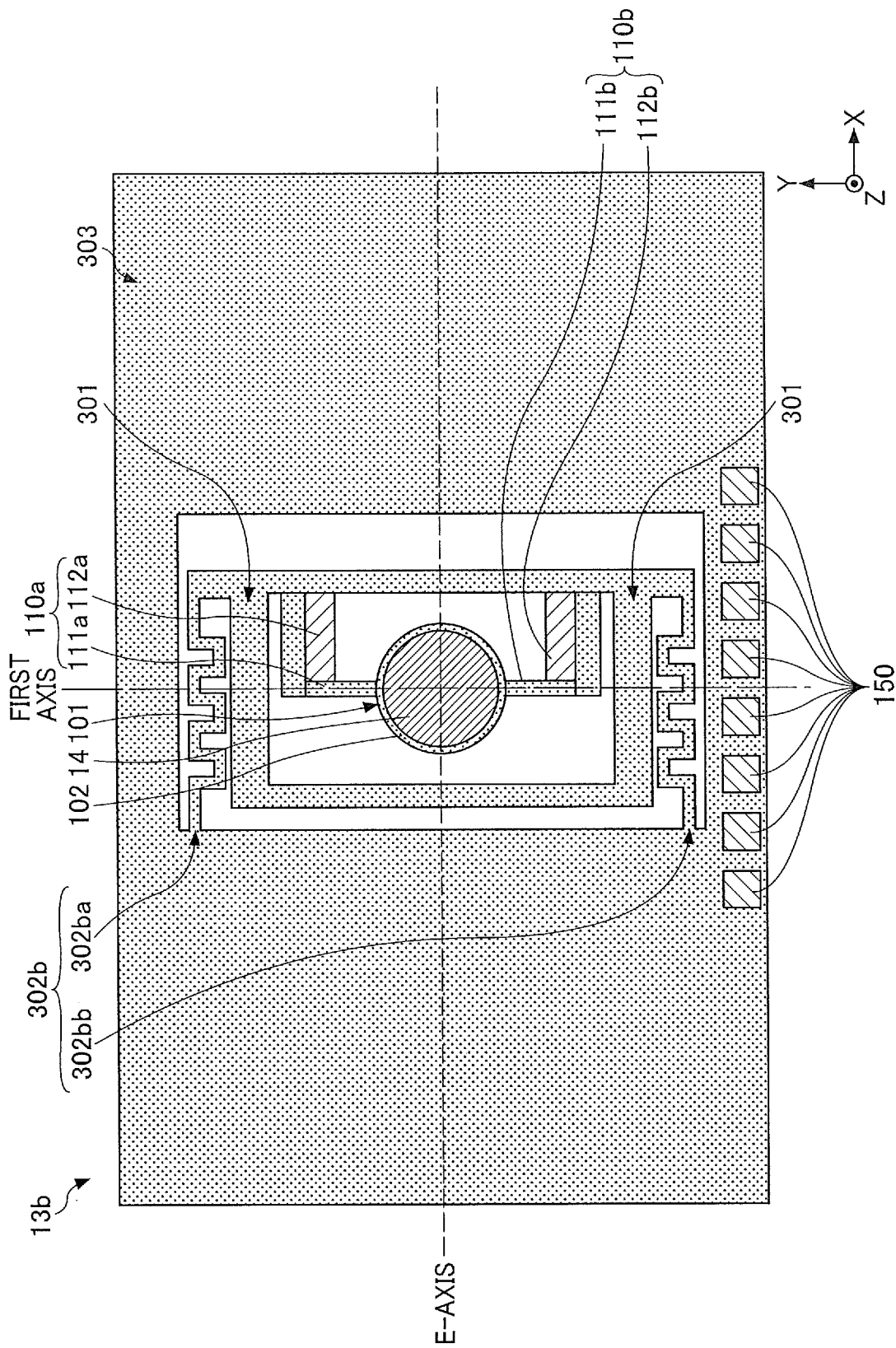

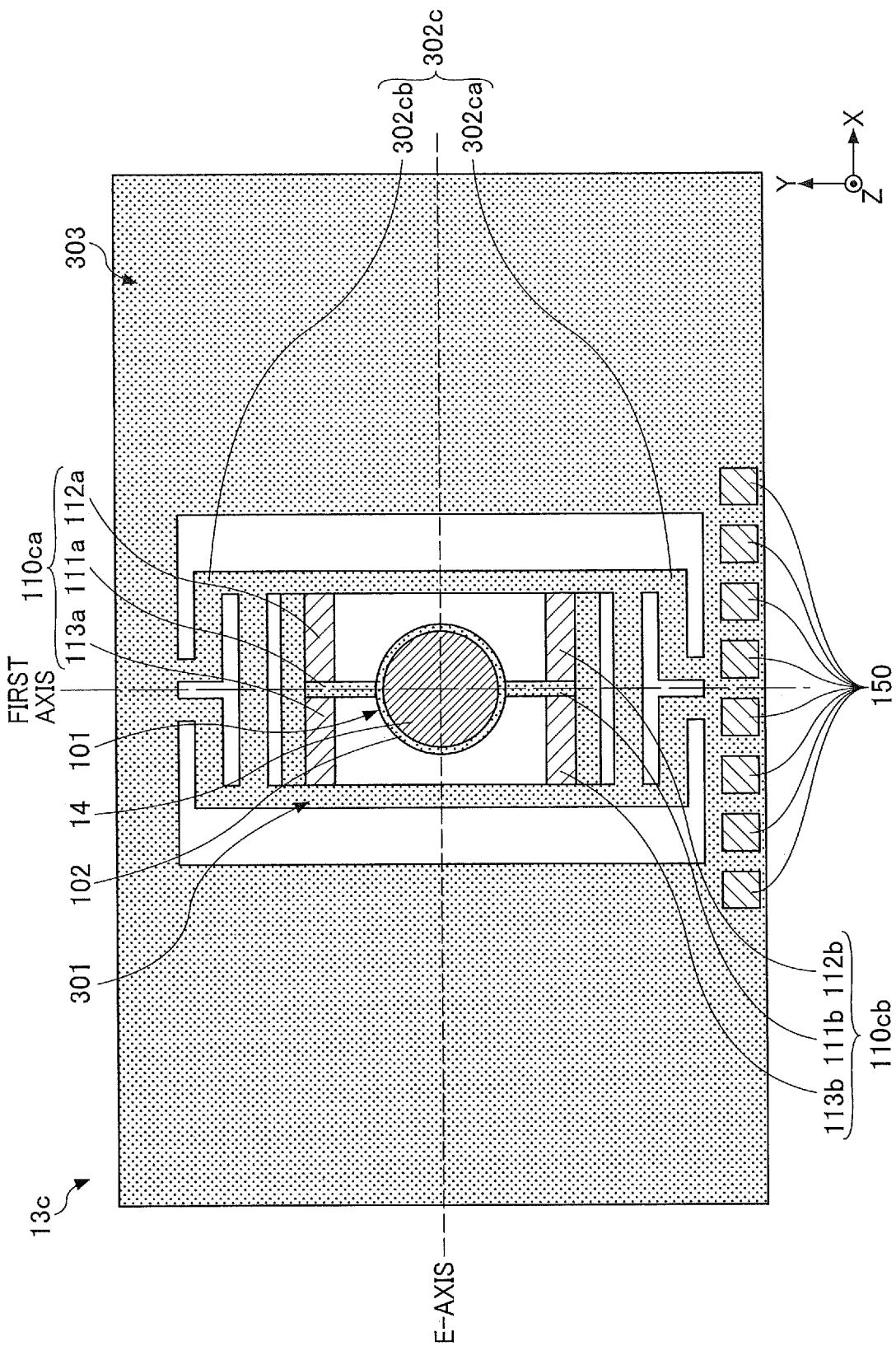

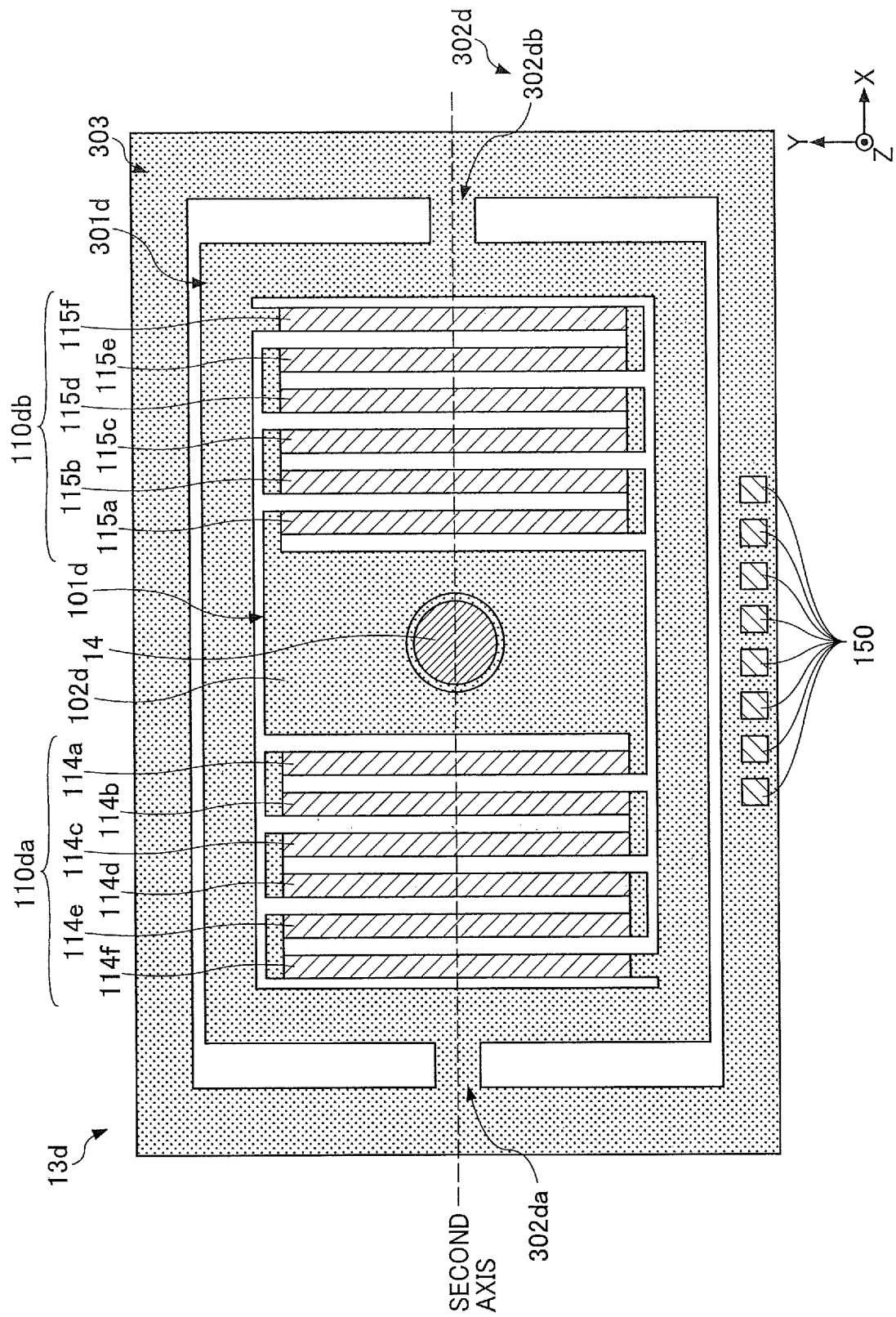

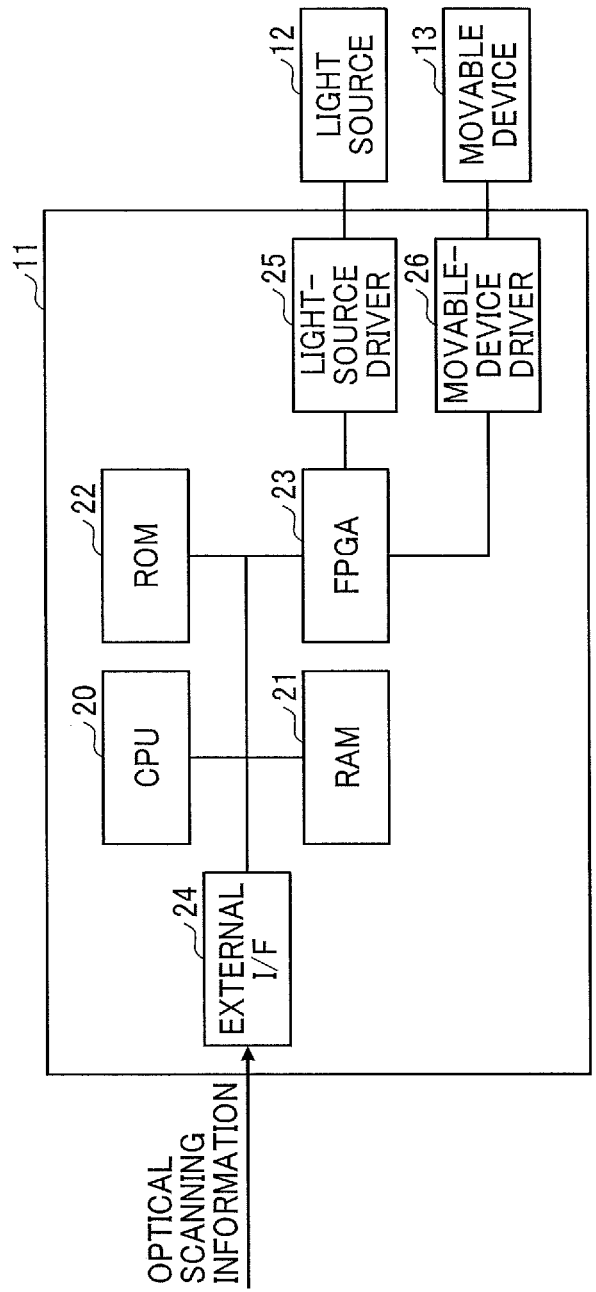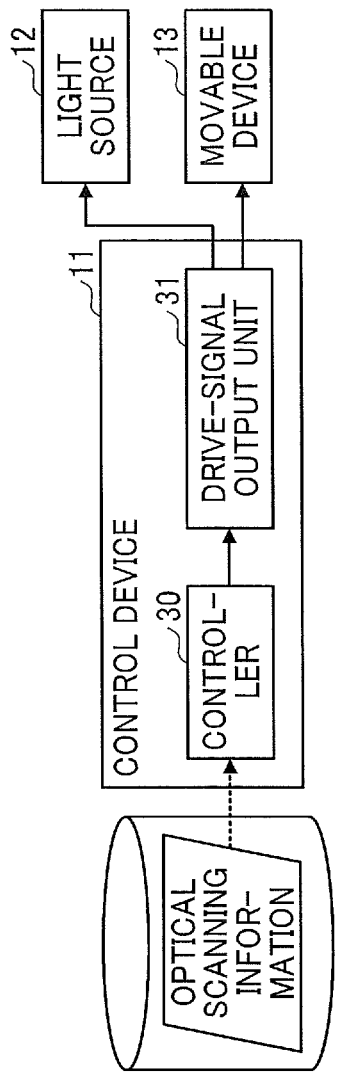

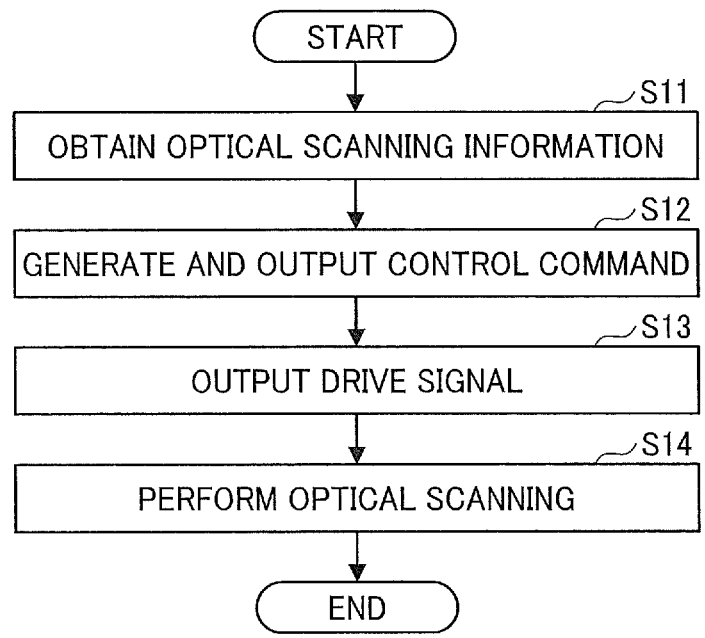
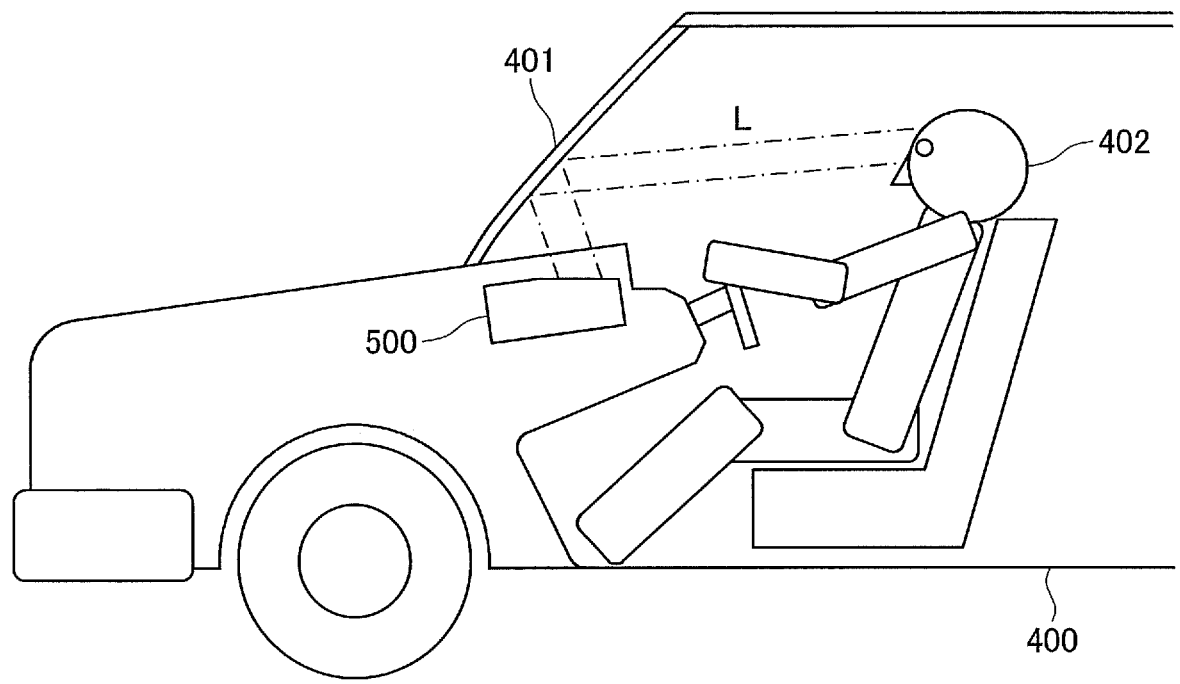

MOVABLE DEVICE, IMAGE PROJECTION APPARATUS, LASER HEADLAMP, HEAD-MOUNTED DISPLAY, DISTANCE MEASUREMENT DEVICE, AND MOBILE OBJECT

CROSS-REFERENCE TO RELATED APPLICATIONS

This patent application is based on and claims priority pursuant to 35 U.S.C. § 119(a) to Japanese Patent Application No. 2021-043779, filed on Mar. 17, 2021, in the Japan Patent Office, the entire disclosure of which is hereby incorporated by reference herein.

BACKGROUND

Technical Field

Embodiments of the present disclosure relate to a movable device, an image projection apparatus, a laser headlamp, a head-mounted display (HMD), a distance measurement device, and a mobile object.

Related Art

In recent years, with the development of micromachining technology applying semiconductor manufacturing technology, development of micro electro mechanical systems (MEMS) device manufactured by micromachining silicon or glass is advancing.

A MEMS device is an example of a light deflector that includes a mirror with a reflecting surface, a first support surrounding the mirror, a torsion bar coupling the mirror to the first support, a first piezoelectric actuator, a second support surrounding the first support, and a second piezoelectric actuator. The first piezoelectric actuator actuates the torsion bar to causes the mirror to oscillate about a first axis extending along the axis of the torsion bar using piezoelectric actuation. The second piezoelectric actuator has a meandering structure with one end connected to the first support and the other end connected to the second support. The second piezoelectric actuator actuates the first support to oscillate about a second axis intersecting with the first axis.

SUMMARY

An embodiment of the present disclosure provides a movable device including: a movable portion; a drive unit having one end connected to the movable portion to rotate the movable portion; a support supporting the drive unit; a connecting portion having one end connected to the support to support the support; and a stationary support to which the other end of the connecting portion is connected.

Another embodiment of the present disclosure provides an image projection apparatus including: a light source unit to emit light; the above-described movable device to deflect the light emitted from the light source; and an optical system to form an image with the light deflected by the movable device to project the image.

Still another embodiment of the present disclosure provides a laser headlamp including: a light source to emit light; the above-described movable device to deflect the light emitted from the light source; and a transparent plate having a surface covered with fluorescent material, the transparent plate to transmit the light deflected by the movable device to convert the light transmitted through the transparent plate into white light and allow the white light to be emitted therefrom.

Even another embodiment of the present disclosure provides a head-mounted display including: a light source to emit light; the above-described movable device to deflect the light emitted from the light source; and a light guide plate to guide the light deflected by the movable device; and a mirror to reflect the light guided by the light guide plate to eyes of a user wearing the head-mounted display to allow the user to observe an image formed with the light Yet another embodiment of the present disclosure provides a distance measurement apparatus including: a light source to emit light; the above-described movable device to deflect the light emitted from the light source to irradiate an object with the deflected light; a photosensor to receive light reflected from the object; and circuitry to obtain output based on the received light from the photosensor and calculate a distance to the object based on the output.

Further, a mobile object includes the image projection apparatus, the laser headlamp, or the distance measurement apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 is a plan view of a light deflector as a movable device according to an embodiment of the present disclosure;

FIG. 2 is a cross-sectional view of the movable device taken along an E-axis in FIG. 1;

FIG. 3 is a cross-sectional view of the movable device taken along line PP in FIG. 1;

FIG. 5A is a graph of the relation between oscillation angles and frequencies of a movable device according to a comparative example;

FIG. 5B is a graph of the relation between oscillation angles and frequencies of a movable device according to an embodiment of the present disclosure;

FIG. 6 is a plan view of a movable device according to a first modification of an embodiment;

FIG. 7 is a plan view of a movable device according to a second modification of the first embodiment;

FIG. 8 is a plan view of a movable device according to a third modification of the first embodiment;

FIG. 9 is a plan view of a movable device according to a fourth modification of the first embodiment;

FIG. 15 is a hardware block diagram of the optical scanning system in FIG. 14;

FIG. 16 is a functional block diagram of a control device according to an embodiment of the present disclosure;

FIG. 17 is a flowchart of processing involved in the optical scanning system, according to an embodiment of the present disclosure;

FIG. 18 is a schematic view of an example of a vehicle equipped with a head-up display device (HUD);

Figure 4:
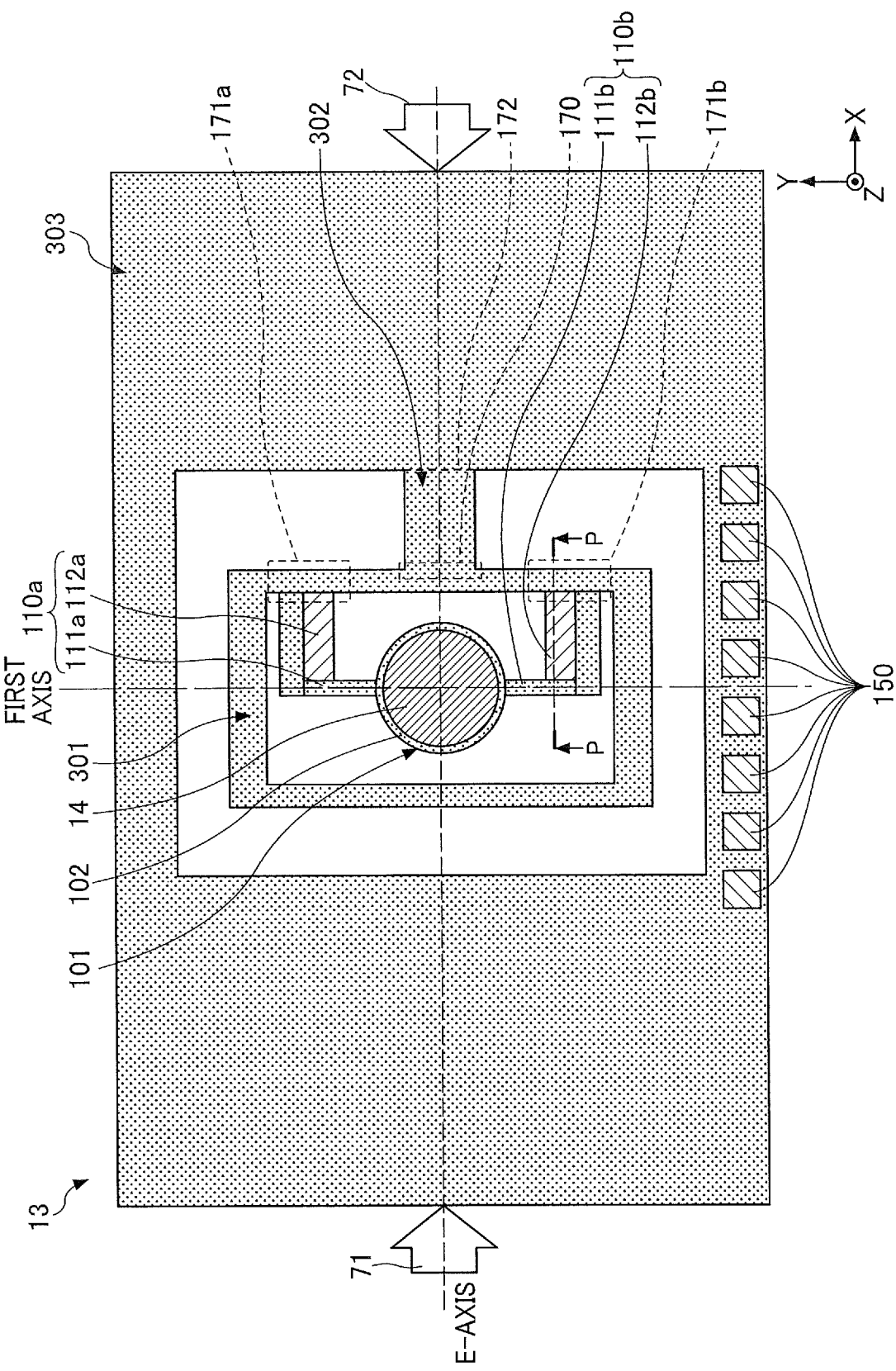
FIG. 4 is an illustration of loads imposed on the movable device according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

As used herein, the term "connected/coupled" includes both direct connections and connections in which there are one or more intermediate connecting elements.

Embodiments of the present disclosure achieve a stable rotation of a movable unit.

Embodiments of the present disclosure are described in detail with reference to the drawings. Like reference signs are applied to identical or corresponding components throughout the drawings and redundant description thereof may be omitted.

In the description of the embodiments of the present disclosure, terms such as rotation, oscillation, and movement (movable) are synonymous. In the drawings, the Z direction is parallel to a direction in which layers are stacked in a piezoelectric drive circuit, and the X direction and the Y direction are orthogonal to each other within a plane perpendicular to the Z direction. Further, the "plan view" refers to viewing an object in the Z direction.

In addition, a direction indicated by an arrow in the X-direction is referred to as a +X-direction, a direction opposite to the +X-direction is referred to as a −X-direction, a direction indicated by an arrow in the Y-direction is referred to as a +Y-direction, a direction opposite to the +Y-direction is referred to as a −Y-direction, a direction indicated by an arrow in the Z-direction is referred to as a +Z-direction, and a direction opposite to the +Z-direction is referred to as a −Z-direction. However, these directions do not limit the orientation of the movable device, and the movable device is oriented in any desired direction.

First Embodiment

The configuration of the movable device 13 according to the first embodiment will be described with reference to FIGS. 1 to 3. FIG. 1 is a plan view of the movable device 13. FIG. 2 is a cross-sectional view of the movable device 13 taken along an E-axis in FIG. 1. FIG. 3 is a cross-sectional view of the movable device 13 taken along line PP in FIG. 1.

The movable device 13 in FIG. 1 has a mirror 101, drive units 110a and 110b, a support 301, a connecting portion 302, a stationary support 303, and electrode connecting parts 150.

The mirror 101 is an example of a movable portion having a reflecting surface 14 that reflects incident light.

One end of each of the drive units 110a and 110b is connected to the mirror 101 to allow the mirror 101 to rotate around a first axis parallel to the Y-axis. The drive units 110a and 110b are elastically deformed to rotate the mirror 101 about the first-axis.

The mirror 101 and the drive units 110a and 110b are surrounded by the support 301. The support 301 is connected to the other eds of the drive units 110a and 110b to elastically support the drive units 110a and 110b.

One end of the connection portion 302 is connected to the support 301 to elastically support the support 301. The other end 172 of the connecting portion 302 is connected to the fixed support 303.

Further, a connecting region 170 where the connecting portion 302 is connected to the support 301 is a region other than the elastic support regions 171a and 171b which are regions extending from the drive units 110a and 110b in a direction (i.e., the X-direction in FIG. 1) in which the drive units 110a and 110b extend to the support 301. In other words, the connecting region 170 where the connecting portion 302 is connected to the support 301 is not included in the elastic support regions 171a and 171b which are regions extending from the drive units 110a and 110b in the direction in which the drive units 110a and 110b extend to the support 301.

The other end of the connecting portion 302 is connected to the stationary support in a direction along the E-axis substantially perpendicular to the first axis. The connection portion 302 is substantially symmetrical about the E-axis passing through the center of the mirror 101 and substantially perpendicular to the first axis.

The term "substantially symmetrical" is intended to include a deviation to the extent that is generally recognized as an error with respect to a symmetrical shape. The meaning of "substantially" is the same as that of the term "substantially" used hereinafter.

The electrode connecting parts 150 are electrically connected to the drive units 110a and 110b and a control device 11.

The movable device 13 includes, one silicon on insulator (SOI) substrate that is formed by any appropriate treatment method, such as etching. On the formed SOI substrate, the reflecting surface 14, the drive units 110a and 110b, and the electrode connecting parts are formed, which constitutes a single integrated unit of the above-described components. The above-described multiple components may be formed after the SOI substrate is molded, or may be formed while the SOI substrate is being molded.

As illustrated in FIG. 2, the SOI substrate, on which the movable device 13 is formed, includes a silicon supporting layer 161 containing single crystal silicon (Si), a silicon oxide layer 162 on the +Z-surface of the silicon supporting layer 161, a silicon active layer containing single crystal Si on the silicon oxide layer 162. The silicon oxide layer 162 is referred to also as a buried oxide (BOX) layer.

The silicon active layer 163 has a smaller thickness in the Z-axis than the thickness along the X-axis or the Y-axis. With such a configuration, any member made of the silicon active layer 163 serves as an elastic member having elasticity.

The SOI substrate does not have to be planar, and may have, for example, a curvature. As long as the substrate can be integrally processed by etching or the like and can be partially elastic, the member used for forming the movable device 13 is not limited to the SOI substrate.

The mirror 101 includes, for example, a circular mirror base 102 and the reflecting surface 14 that is formed on the +Z surface of the mirror base 102. The mirror base 102 includes, for example, a silicon active layer 163. The reflecting surface 14 includes a thin metal film containing aluminum (Al), gold (Au), and silver (Ag).

The mirror 101 may include a rib 103 for strengthening the mirror unit on the —Z surface of the mirror base 102. Such a rib 103 includes, for example, the silicon supporting layer 161 and the silicon oxide layer 162, serving to prevent the distortion of the reflecting surface 14 due to the motion. However, the rib 103 is not an essential component.

The drive units 110a and 110b include two torsion bars 111a and 111b and piezoelectric drive units 112a and 112b. Each of the torsion bars 111a and 111b has one end connected to the mirror base 102 and extends along the first axis to support the mirror 101 while allowing the mirror 101 to rotate. One end of each of the piezoelectric drive units 112a and 112b is connected to a corresponding one of the torsion bars 111a and 111b, and the other end of each of the piezoelectric drive units 112a and 112b is connected to the inner peripheral portion of the support 301.

The torsion bars 111a and 111b each includes a silicon active layer 163 (see FIG. 3). The piezoelectric drive units 112a and 112b each include the lower electrode 201, the piezoelectric unit 202, and the upper electrode 203 that are formed in that order on the +Z surface of the silicon active layer 163 that serves as an elastic body. For example, each of the upper electrode 203 and the lower electrode 201 contains gold (Au) or platinum (Pt). For example, the piezoelectric unit 202 contains lead zirconate titanate (PZT) as a piezoelectric material.

As illustrated in FIGS. 1 to 3, the support 301 is, for example, a rectangular support body including the silicon support layer 161, the silicon oxide layer 162, and the silicon active layer 163, and surrounding the mirror 101.

The stationary support 303 is, for example, a rectangular support body including the silicon support layer 161, the silicon oxide layer 162, and the silicon active layer 163, and surrounding the mirror 101, the drive units 110a and 110b, and the support 301.

Each electrode connecting part 150 is formed on the +Z-surface of the stationary support 303 and is electrically connected to the upper electrode 203 and the lower electrode of each of the piezoelectric drive units 112a and 112b, and also to the control device 11 via electrode wiring of aluminum (Al) or the like. Each of the upper electrodes 203 and the lower electrodes 201 may be directly connected to the electrode connecting parts 150. Alternatively, in some embodiments, the upper electrodes 203 and the lower electrodes 201 may be indirectly connected to the electrode connecting parts 150 through a wire that connects a pair of electrodes.

Although this embodiment has illustrated an example in which the piezoelectric unit is formed on a surface (+Z surface) of the silicon active layer 163 serving as the elastic member, the piezoelectric unit 202 may be formed on another surface (for example, —Z surface) of the elastic member, or on both the surface and the other surface of the elastic member.

The shapes and the number of the components are not limited to those in FIGS. 1 to 3 as long as the mirror 101 is rotatable about the first axis. The torsion bars 111a and 111b, and the piezoelectric drive units 112a and 112b may have shapes with curvatures.

Furthermore, an insulating layer that is made of, for example, a silicon oxide layer may be formed on at least one of the +Z-surface of the upper electrode 203 of the drive units 110a and 110b, the +Z-surface of the support 301, and the +Z-surface of the stationary support 303. In this case, electrode wiring is provided on the insulating layer, and the insulating layer is partially removed as an opening or is not formed at a connection spot where the upper electrode 203 or the lower electrode 201 and the electrode wiring are connected. Thus, the drive units 110a and 110b, and the electrode wiring can be designed with a higher degree of freedom, and furthermore, a short circuiting due to the contact between electrodes can be prevented. The silicon oxide film also serves as an anti-reflection member.

Next, the control by the control device 11 that drives the drive units 110a and 110b of the movable device 13 is described in detail.

Each of the drive units 110a and 110b includes a piezoelectric unit 202. When voltage that is positive or negative in the direction of polarization is applied to the piezoelectric unit 202, the piezoelectric unit 202 deforms (for example, expands and contracts) according to the electrical potential of the applied voltage—inverse piezoelectric effects occur. The drive units 110a and 110b rotate the mirror 101 using the above-described piezoelectric effects.

In this case, the angle defined by the reflecting surface 14 of the mirror 101 with respect to the XY plane when the reflecting surface 14 is inclined to the +Z direction or —Z direction with respect to the XY plane is referred to as oscillation angle. Note also that the +Z-direction is referred to as a positive oscillation angle and the —Z-direction is referred to as a negative oscillation angle.

In the drive units 110a and 110b, when a driving voltage is applied in parallel with the piezoelectric unit 202 of the piezoelectric drive units 112a and 112b through the upper electrode 203 and the lower electrode 201, the piezoelectric unit 202 is deformed. With such deformation of the piezoelectric unit 202, the piezoelectric drive units 112a and 112b bend and deform, which causes the torsion bars 111a and 111b to be twisted. The twisting of the torsion bars 111a and 111b applies a driving force around the first axis to the mirror 101, and thus rotates the mirror 101 around the first axis. The drive voltages applied to the drive units 110a and 110b are controlled by the control device 11.

For example, the control device 11 applies a driving voltage with a predetermined sine waveform to the piezoelectric drive units 112a and 112b of the drive units 110a and 110b, and thus causes the mirror 101 to rotate around the first axis in a cycle of a predetermined sine waveform of the drive voltage.

For example, if the frequency of the sine-waveform voltage is set to about 20 kilohertz (kHz), which is substantially equal to a resonant frequency of the torsion bars 111a and 111b, by using mechanical resonance as a result of the torsion of the torsion bars 111a and 111b, the mirror 101 can be resonated at about 20 kHz.

The following describes advantageous effects of the movable device 13.

When a movable device as a MEMS device is mounted on a circuit board or a package member, differences in thermal expansion coefficient between an Si substrate of the movable device and the circuit board might increase a load such as a thermal stress applied to a contact surface between the Si substrate and the circuit board with an increase in environmental temperature. When a load is applied to the movable apparatus, static characteristics of the movable apparatus, such as static deformation, or dynamic characteristics of the movable apparatus, such as a frequency response, a rotation sensitivity, a vibration frequency, or a vibration direction, may deteriorate.

FIG. 4 is an illustration of loads applied to the movable device according to an embodiment. In FIG. 4, the loads are applied to the stationary support 303 in directions indicated by outlined arrows 71 and 72 (i.e., along the E-axis) from both sides of the movable device 13.

A movable device according to a comparative example under such a load may have its stationary support compressed in the X-direction and thus undergoes deformation, including bending deformation of the central portion in the —Z-direction. Such a deformation deteriorates the frequency characteristics of the movable device and causes an unstable rotation of a movable portion of the movable device.

In contrast, the movable device 13 according to an embodiment includes a mirror 101 (i.e., a movable portion) and drive units 110a and 110b, one end of which is connected to the mirror 101 to allow the mirror 101 to rotate. The movable device 13 further includes a support 301 that elastically supports the drive units 110a and 110b, a connecting portion 302 having one end connected to the support 301 and elastically supporting the support 301, and a stationary support 303 to which the other end of the connecting portion 302 is connected.

In the movable device 13, the support 301 supporting the drive units 110a and 110b is not directly supported by the stationary support 303, but supported by the stationary support through the connecting portion 302. This arrangement prevents the mechanical stress applied to the stationary support 303 from affecting the support 301 adjacent to the free end of the connecting portion 302 as viewed from the stationary support 303 although such a mechanical stress changes how the connecting portion 302 is supported by the stationary support 303.

Further, the difference in frequency characteristics between the connecting portion and the drive units 110a and 110b prevents resonance of the connecting portion 302 in response to the rotation of the drive units 110a and 110b. This further prevents a change in the characteristics of the connecting portion 302 due to a change in how the connecting portion 302 is supported by the stationary support 303, from affecting the rotation of the mirror 101 connected to an area closer to the free end of the connecting portion 302 than the other end of the connecting portion 302 connected to the stationary support 303.

In other words, the connecting portion 302 serves as a buffer structure for buffering the mechanical stresses and changes in the supporting condition of the drive units 110a and 110b. This configuration reduces or eliminates a change in static or dynamic characteristics of the movable device 13 when a mechanical stress is applied to the stationary support 303, and thus enables a stable rotation of the mirror 101.

FIG. 4 is an illustration of loads applied to the movable device 13. This does not mean that the rotation of the mirror 101 of the movable device 13 according to an embodiment becomes unstable due to such applied loads thereto.

Further, the loads applied to the movable device are caused by a mechanical stress applied to the stationary support 303, external vibration and impact, or a load applied to the stationary support 303 due to an increased oscillation angle of the movable device 13, in addition to the thermal stress.

FIGS. 5A and 5B are illustrations of the frequency characteristics of the movable device according to an embodiment. FIG. 5A is a graph of the relation between oscillation angles and frequencies of a movable device according to a comparative example. FIG. 5B is a graph of the relation between oscillation angles and frequencies of a movable device according to an embodiment of the present disclosure. FIGS. 5A and 5B present simulation results of the relation between frequencies and oscillation angles of a mirror (a movable unit) before and after imposing loads on the stationary support of the movable device.

FIG. 5A presents a significant change in the frequency characteristics of the mirror between before and after imposing loads on the stationary support of the movable device. This change is caused by, for example, a change in the stiffness of the movable apparatus due to loads imposed thereon or a structural collision.

Such a change in the frequency characteristics may deteriorate accuracy of control of the rotation of the mirror. For example, the resonance frequency set to about 20 kHz fluctuates by about several hundred hertz, and the frequency response characteristics may go back and forth between softening and hardening.

In contrast, FIG. 5B presents substantially no changes in the frequency characteristic of the mirror 101 between before and after imposing loads on the stationary support of the movable device, and the graph curves before and after imposition of loads substantially coincide with each other. This configuration reduces or eliminates a change in static or dynamic characteristics of the movable device 13 when a mechanical stress is applied to the stationary support 303, and thus enables a stable rotation of the mirror 101.

Further, in the present embodiment, a connecting region 170 where the connecting portion 302 is connected to the support 301 is a region other than the elastic support regions 171a and 171b which are regions extending from the drive units 110a and 110b in a direction (i.e., the X-direction in FIG. 1) in which the drive units 110a and 110b extend to the support 301. In other words, the connecting region 170 where the connecting portion 302 is connected to the support 301 is not included in the elastic support regions 171a and 171b which are regions extending from the drive units 110a and 110b in the direction in which the drive units 110a and 110b extend to the support 301.

With this configuration, the connecting portion 302 and the drive unit 110a are not disposed linearly as viewed from the mirror 101, and the connecting portion 302 and the drive unit 110b are not disposed linearly as viewed from the mirror 101. This arrangement substantially prevents transmission of the mechanical stress imposed on the stationary support to the drive units 110a and 110b through the connecting portion 302, and thus reduces or eliminates a change in static or dynamic characteristics of the movable device 13. Thus, the mirror 101 will stably rotate. Further, such a configuration according to the present embodiment eliminates undesired rotational components to be imposed on the mirror 101, and thus allows the mirror 101 to stably rotate at a higher oscillation angle without being inhibited by any undesired rotational components.

In the present embodiment, the other end 172 of the connecting portion 302 is connected to the stationary support 303 in a direction intersecting with the first axis (i.e., the axis of rotation of the mirror 101 caused by the driving units 110a and 110b).

If the other end of the connecting portion 302 is connected to the stationary support in a direction parallel to the first axis, for example, the force due to the rotation of the mirror 101 is transmitted to the stationary support 303 via the connection portion 302. This imposes loads on the stationary support 303, and thus possibly changes the static or dynamic characteristics of the movable device 13. Particularly with a higher oscillation angle of the mirror 101, the force due to the rotation of the mirror 101 increases to thus change the static or dynamic characteristics of the movable device 13 more significantly.

With the other end of the connecting portion 302 being connected to the stationary support 303 in the direction intersecting with the first axis, the force due to the rotation of the mirror 101 is prevented from being transmitted to the stationary support 303 via the connection portion 302, thus enabling a stable rotation of the mirror 101. Such an advantageous effect is more marked particularly when the oscillation angle of the mirror 101 is higher.

In the present embodiment, the connecting portion 302, which is extending along the E-axis substantially perpendicular to the first axis, is connected to the stationary support 303. This configuration reduces transmission of force caused by the rotation of the mirror 101 to the stationary support 303 and thus enables a more stable rotation of the mirror 101. Such an advantageous effect is more marked particularly when the oscillation angle of the mirror 101 is higher.

The connection portion 302 is substantially symmetrical about the E-axis passing through the center of the mirror 101 and substantially perpendicular to the first axis. This configuration allows a symmetrical distribution of the load on the connecting portion 302 and thus prevents imbalance in the load so as to enable a stable rotation of the mirror 101.

Further, the resonance frequencies of the connecting portion 302 are lower than the resonance frequencies of the drive units 110a and 110b. This configuration allows the load generated by the resonance of the drive units 110a and 110b to be absorbed by the connecting portion 302, and thus prevents transmission of such a load to the stationary support 303.

The method of controlling the drive of the movable device 13 (i.e., the drive control method) may be either resonance drive or non-resonance drive. To obtain more successful effect of the present embodiment, the difference in resonance frequency between the connecting portion 302 and the mirror 101 is to be 10% or greater of the resonance frequency of the mirror 101.

Modifications of First Embodiment

Next, a modified example of the first embodiment will be described. The same components as those in the first embodiment are denoted by the same reference numerals, and redundant description thereof is omitted as appropriate. The same applies to other modified examples and embodiments described below.

FIG. 6 is a plan view of a movable device 13a according to a first modification of an embodiment. The movable device 13a in FIG. 6 includes a connecting portion 302a. Further, the connecting portion 302a includes a first connecting portion 302aa and a second connecting portion 302ab. The first connecting portion 302aa and the second connecting portion 302ab are examples of an even number of connecting portions, which is two or more.

One end of each of the first connecting portion 302aa and the second connecting portion 302ab is connected to the support 301. The other end of each of the first connecting portion 302aa and the second connecting portion 302ab is connected to the stationary support 303. Each of the first connecting portion 302aa and the second connecting portion 302ab extends in a direction along the E-axis. Further, the first connecting portion 302aa and the second connecting portion 302ab have a bending intrinsic resonance mode to bend in the Z-direction which is the same as the direction of rotation of the mirror 101 caused by the drive units 110a and 110b.

Since the free ends (i.e., the other end of each of the first connecting portion 302aa and the second connecting portion 302ab) of the connecting portion 302a elastically supported by the stationary support 303 are connected to the support 301, the elastic support of the drive units 110a and 110b by the support 301 does not depend on the mechanical stress on the stationary support 303.

Such a configuration allows the stationary support 303 to be separated into two parts, and thus increases the flexibility of the configuration of the movable device 13a. For example, the movable device 13a may include a large-diameter mirror, or may include a mirror that is rotatable with a higher oscillation angle.

The configuration in which the connecting portion 302a has a rotational twisting intrinsic resonance mode to rotationally twist in the Z-direction which is the same as the direction of rotation of the mirror 101 caused by the drive units 110a and 110b also exhibits the same advantageous effects as those according to the described-above embodiments.

The support 301 is elastically supported by the first connecting portion 302aa and the second connecting portion 302ab. In this case, the first connecting portion 302aa and the second connecting portion 302ab are positioned to have the support 301 between the first connecting portion 302aa and the second connecting portion 302ab along the first axis.

With this configuration, the connecting portion 302a has a substantially symmetrical about the E-axis. This configuration allows a symmetrical distribution of the load on the connecting portion 302a and thus prevents imbalance in the load so as to enable a stable rotation of the mirror 101.

In this modification, the connecting portion 302a includes two connecting portions. However, no limitation is intended thereby. Alternatively, the connecting portion 302a includes two or more connecting portion, whose number is even.

FIG. 7 is a plan view of a movable device 13b according to a second modification of an embodiment. The movable device 13b in FIG. 7 includes a connecting portion 302b. The connecting portion 302b includes a first connecting portion 302*ba* and a second connecting portion 302*bb*. Each of the first connecting portion 302*ba* and the second connecting portion 302*bb* has a turning structure.

FIG. 7 is an example of a turning structure having corners each with a substantially right angle. Alternatively, each corner of the turning structure may have a curvature. Further, each of the first connecting portion 302*ba* and the second connecting portion 302*bb* has a constant thickness or gradually variable thickness. The structure or material of the first connecting portion 302*ba* and the second connecting portion 302*bb* is to be adjusted to allow a higher stiffness of the stationary support 303 side and a lower stiffness of the support 301 side. This configuration exhibits the same advantageous effects as those of the movable device 13.

FIG. 8 is a plan view of a movable device 13*c* according to a third modification of an embodiment. The movable device 13*c* in FIG. 7 includes drive units 110*ca* and 110*cb* and a connecting portion 302*c*. The drive unit 110*ca* includes a piezoelectric drive unit 113*a*, and the drive unit 110*cb* includes a piezoelectric drive unit 113*b*. Further, the connecting portion 302*c* includes a first connecting portion 302*ca* and a second connecting portion 302*cb*.

The drive unit 110*ca* has a both-end supported beam structure. The piezoelectric drive unit 112*a* and the piezoelectric drive unit 113*a* elastically support the torsion bar 111*a* from both sides along the E-axis, and the piezoelectric drive unit 112*b* and the piezoelectric drive unit 113*b* elastically support the torsion bar 111*b* from both sides along the E-axis.

The first connecting portion 302*ca* and the second connecting portion 302*cb* are symmetrical about the first axis. This configuration reduces or eliminates a change in static or dynamic characteristics of the movable device 13*c* when a mechanical stress is applied to the stationary support 303, and thus enables a stable rotation of the mirror 101, irrespective of whether the movable device 13*c* has such a configuration or not.

FIG. 9 is a plan view of a movable device 13*d* according to a forth modification of an embodiment. The movable device 13*d* in FIG. 9 has drive units 110*da* and 110*db*, a mirror 101*d*, a support 301*d*, and a connecting portion 302*d*. The connecting portion 302*d* includes a first connecting portion 302*da* and a second connecting portion 302*db*.

The drive unit 110*da* include, for example, multiple piezoelectric drive units 114*a* to 114*f* which are joined so as to turn. One end of the drive unit 110*da* is connected to a mirror base 102*d* included in the mirror 101, and the other end of the drive unit 110*da* is connected to the support 301*d*.

The drive unit 110*db* include, for example, multiple piezoelectric drive units 115*a* to 115*f* which are joined so as to turn. One end of the drive unit 110*da* is connected to the mirror base 102*d* included in the mirror 101, and the other end of the drive unit 110*da* is connected to the support 301*d*.

In other words, the drive units 110*da* and 110*db* have a turning structure in which one end of each of the drive units 110*da* and 110*db* is connected to the mirror 101*d* and the other end of each of the drive units 110*da* and 110*db* is connected to the support 301.

The connecting portion between the drive unit 110*da* and the mirror base 102*d* and the connecting portion between the drive unit 110*db* and the mirror base 102*d* are substantially point-symmetrical with respect to the center of the reflecting surface 14. The connecting portion between the drive unit 110*da* and the support 301*d* and the connecting portion between the drive unit 110*db* and the support 301*d* are substantially point-symmetrical with respect to the center of the reflecting surface 14.

The drive units 110*da* and 110*db* each include the lower electrode 201, the piezoelectric unit 202, and the upper electrode 203 that are formed in that order on the +Z surface of the silicon active layer 163 that serves as an elastic body. For example, each of the upper electrode 203 and the lower electrode 201 contains gold (Au) or platinum (Pt). For example, the piezoelectric unit 202 contains lead zirconate titanate (PZT) as a piezoelectric material.

The drive units 110*da* and 110*db* elastically deform in response to application of drive voltage thereto, and thus causes the mirror 101*d* to rotate around the second axis.

One end of each of the first connecting portion 302*da* and the second connecting portion 302*db* is connected to the support 301*d*, and the other end thereof is connected to the stationary support 303 in a direction intersecting with the second axis. The first connecting portion 302*da* and the second connecting portion 302*db* extend in a direction substantially parallel to the second axis. The connecting portion 302*d* has a resonance mode to rotate the support 301*d* around the second axis. This mode prevents an unintended oscillation component other than the rotation from being superimposed on the support 301*d*.

This configuration reduces or eliminates a change in static or dynamic characteristics of the movable device 13*d* when a mechanical stress is applied to the stationary support 303, and thus enables a stable rotation of the mirror 101*d*, irrespective of whether the movable device 13*d* has such a turning structure, or a meandering structure.

Second Embodiment

Next, a movable device 13*e* according to the fifth embodiment will be described.

Figure 10:
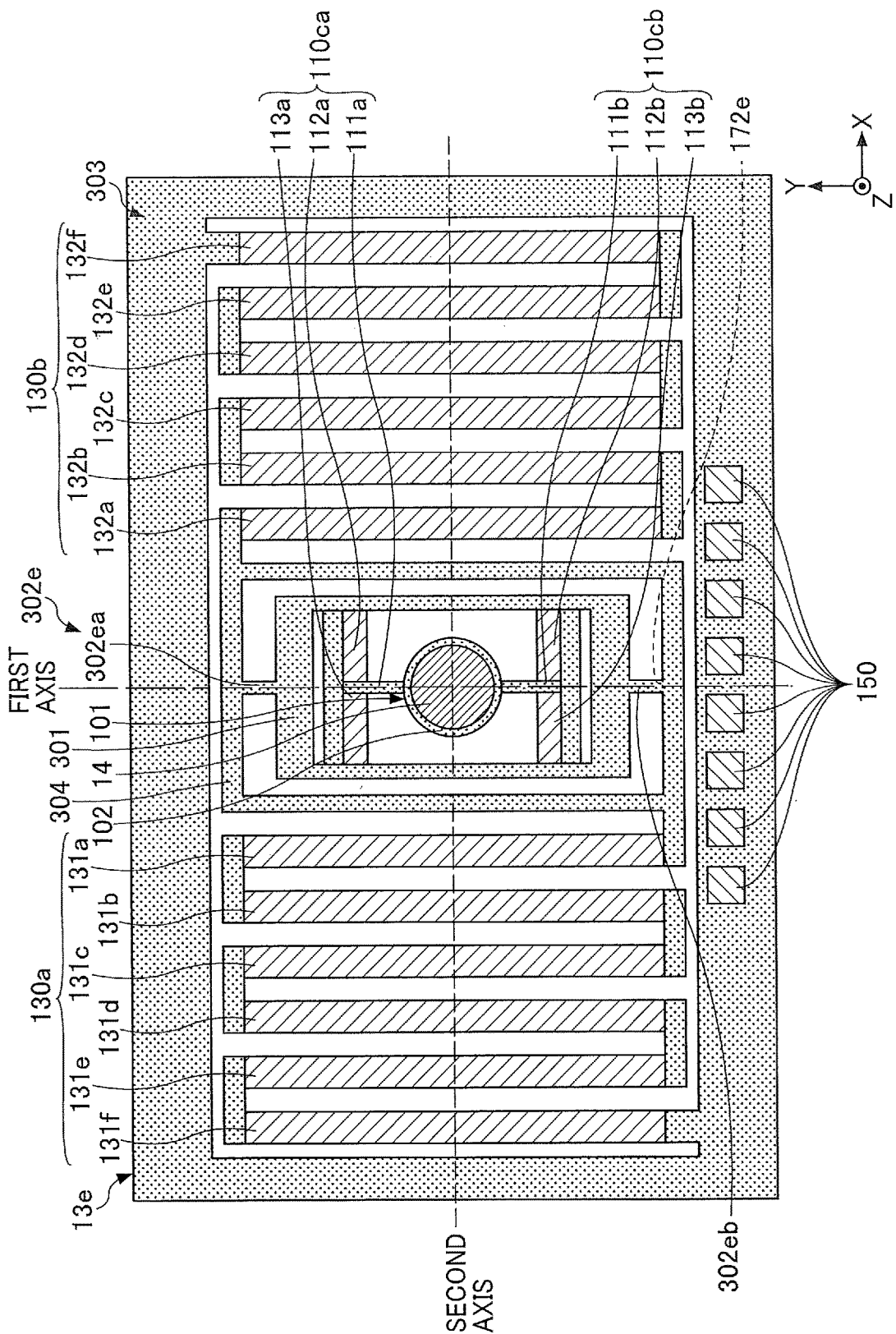
FIG. 10 is a plan view of a movable device according to a second embodiment.

FIG. 10 is a plan view of the movable device 13*e*. The movable device 13*e* in FIG. has a connecting portion 302*e*, a movable frame 304, and frame drive units 130*a* and 130*b*. The connecting portion 302*e* includes a first connecting portion 302*ea* and a second connecting portion 302*eb*.

The frame drive unit 130*a* includes multiple piezoelectric frame drive units 131*a* to 131*f*. One end of the frame drive unit 130*a* is connected to the movable frame 304, and the other end of the frame drive unit 130*a* is connected to the stationary support 303.

The frame drive unit 130*b* includes multiple piezoelectric frame drive units 132*a* to 132*f*. One end of the frame drive unit 130*b* is connected to the movable frame 304, and the other end of the frame drive unit 130*b* is connected to the stationary support 303.

The connecting portion between the frame drive unit 130*a* and the movable frame and the connecting portion between the frame drive unit 130*b* and the movable frame 304 are substantially point-symmetrical with respect to the center of the reflecting surface 14. The connecting portion between the frame drive unit 130*a* and the stationary support 303 and the connecting portion between the frame drive unit 130*b* and the stationary support 303 are substantially point-symmetrical with respect to the center of the reflecting surface 14.

The frame drive units 130*a* and 130*b* each include the lower electrode 201, the piezoelectric unit 202, and the upper electrode 203 that are formed in that order on the +Z surface of the silicon active layer 163 that serves as an elastic body. For example, each of the upper electrode 203 and the lower electrode 201 contains gold (Au) or platinum (Pt). For example, the piezoelectric unit 202 contains lead zirconate titanate (PZT) as a piezoelectric material.

The frame drive units 130a and 130b elastically deform in response to application of drive voltage thereto, and thus causes the movable frame 304 to rotate around the second axis. One end of each of the first connecting portion 302ea and the second connecting portion 302eb is connected to the support 301, and the other end 172e thereof is connected to the movable frame 304 in a direction intersecting with the second axis. The first connecting portion 302ea and the second connecting portion 302eb extend in a direction substantially parallel to the first axis. Notably, the other end 172e refers to the other end of each of the first connecting portion 302ea and the second connecting portion 302eb.

As described above, the movable device 13e includes the movable frame 304 and the frame drive units 130a and 130b. One end of the connecting portion 302e is connected to the support 301, and the other end of the connecting portion 302e is connected to the movable frame 304. One end of each of the frame drive units 130a and 130b is connected to the movable frame 304, and the other end of each of the frame drive units 130a and 130b is connected to the stationary support 303. This arrangement enables the movable frame 304 to rotate.

In a case where the mirror 101 is largely rotated by the drive units 110ca and 110cb, the connecting portion 302e reduces the rotation of the support 301 by twisting twisting the support 301 around the connecting portion 302e. This prevents crosstalk (interference) between rotation caused by the frame drive units 130a and 130b and oscillation caused by the drive units 110ca and 110cb. In other words, the connecting portion 302e serves as a buffer structure for preventing crosstalk (interference) between rotation caused by the frame drive units 130a and 130b and oscillation caused by the drive units 110ca and 110cb. As a result, the mirror 101 stably rotates at higher oscillation angles around two axes perpendicular to each other.

In the present embodiment, the connecting portion 302e extends along a direction intersecting with the second axis (i.e., the axis of the rotation caused by the frame drive units 130a and 130b), and the other end 172e of the connecting portion 302e is connected to the movable frame 304 in the direction intersecting with the second axis. This configuration reduces transmission of force caused by the rotation of the mirror 101 to the movable frame and thus enables a more stable rotation of the mirror 101. Such an advantageous effect is more marked particularly when the oscillation angle of the mirror 101 is higher.

Notably, the resonance frequencies of the connecting portion 302e are preferably higher than the resonance frequencies of the frame drive units 130a and 130b. Such a higher resonance frequency of the connecting portion 302e prevents the crosstalk between the rotation around the first axis and the rotation around the second axis and thus enables a stable oscillation angle of the mirror 101.

To obtain more successful effect of the movable device 13e, the region in which each of the first connecting portion 302ea and the second connecting portion 302eb is connected to the support 301 includes the first axis. The width (i.e., the length along the X-direction) of each of the first connecting portion 302ea and the second connecting portion 302eb is shorter than the distance between the support 301 and the movable frame 304.

Figure 11:
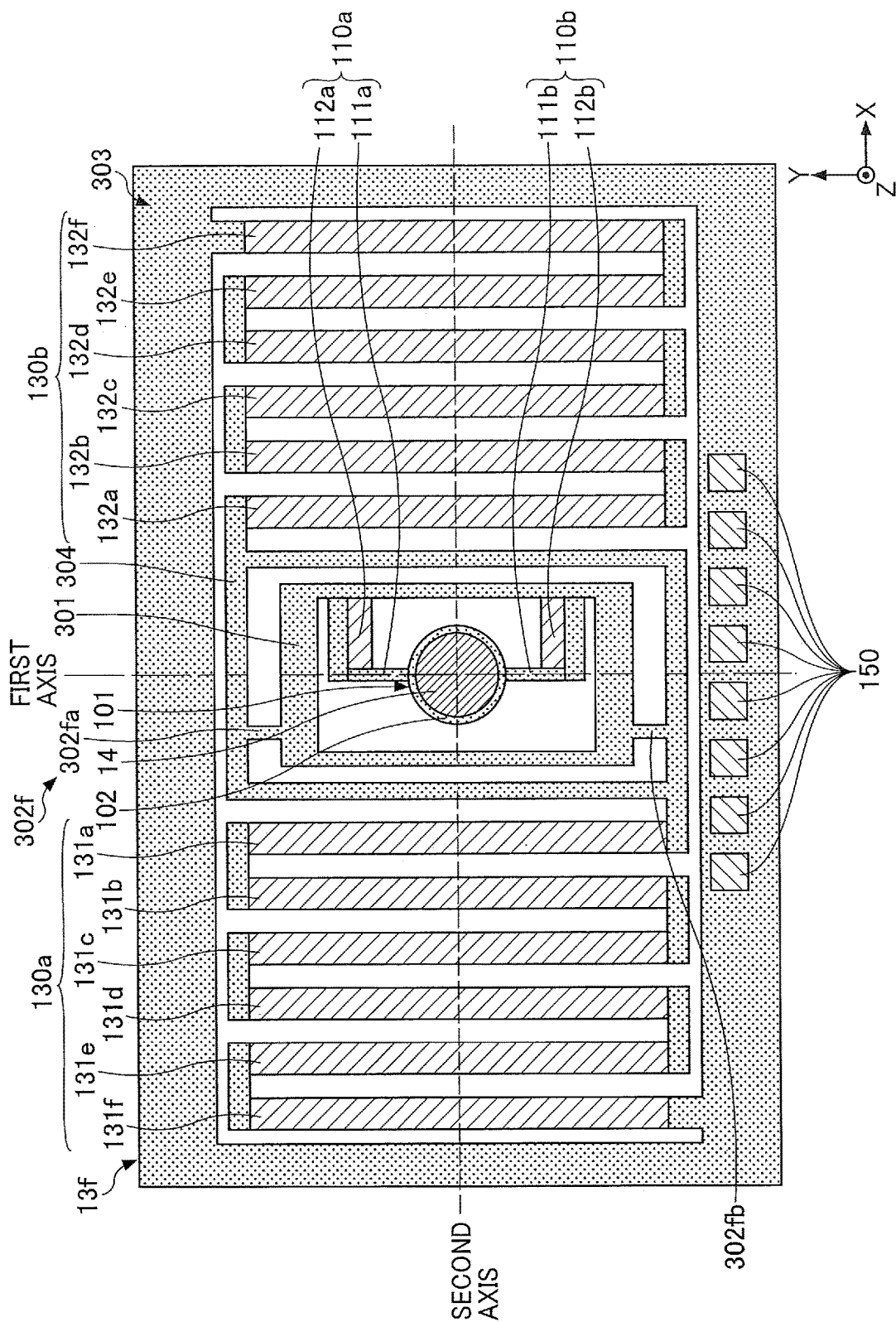
FIG. 11 is a plan view of a movable device according to a modification of the second embodiment.

In FIG. 10, the movable device 13e includes the drive units 110ca and 110cb forming a both-end supported beam structure. However, no limitation is intended thereby. Alternatively, the movable device has a cantilever beam structure. FIG. 11 is a plan view of a movable device 13f having a cantilever beam structure.

The movable device 13f in FIG. 11 includes a connecting portion 302f, and the connecting portion 302f includes a first connecting portion 302fa and a second connecting portion 302fb. One end of each of the first connecting portion 302fa and the second connecting portion 302fb is connected to the support 301, and the other end 172e thereof is connected to the movable frame 304 in a direction intersecting with the second axis. The first connecting portion 302fa and the second connecting portion 302fb extend in a direction substantially parallel to the first axis. The region in which each of the first connecting portion 302ea and the second connecting portion 302eb is connected to the support 301 does not include the first axis.

Such a movable device 13f also obtains the same advantageous effects as those of the movable device 13e. In the present embodiment, the mirror 101 is rotatable around two axes. In some embodiments, the mirror 101 is rotatable around multiple axes, or three or more, and such a configuration exhibits the same advantageous effects as those of the first and second embodiments.

Third Embodiment

Next, a movable device 13g according to the fifth embodiment will be described.

Figure 12:
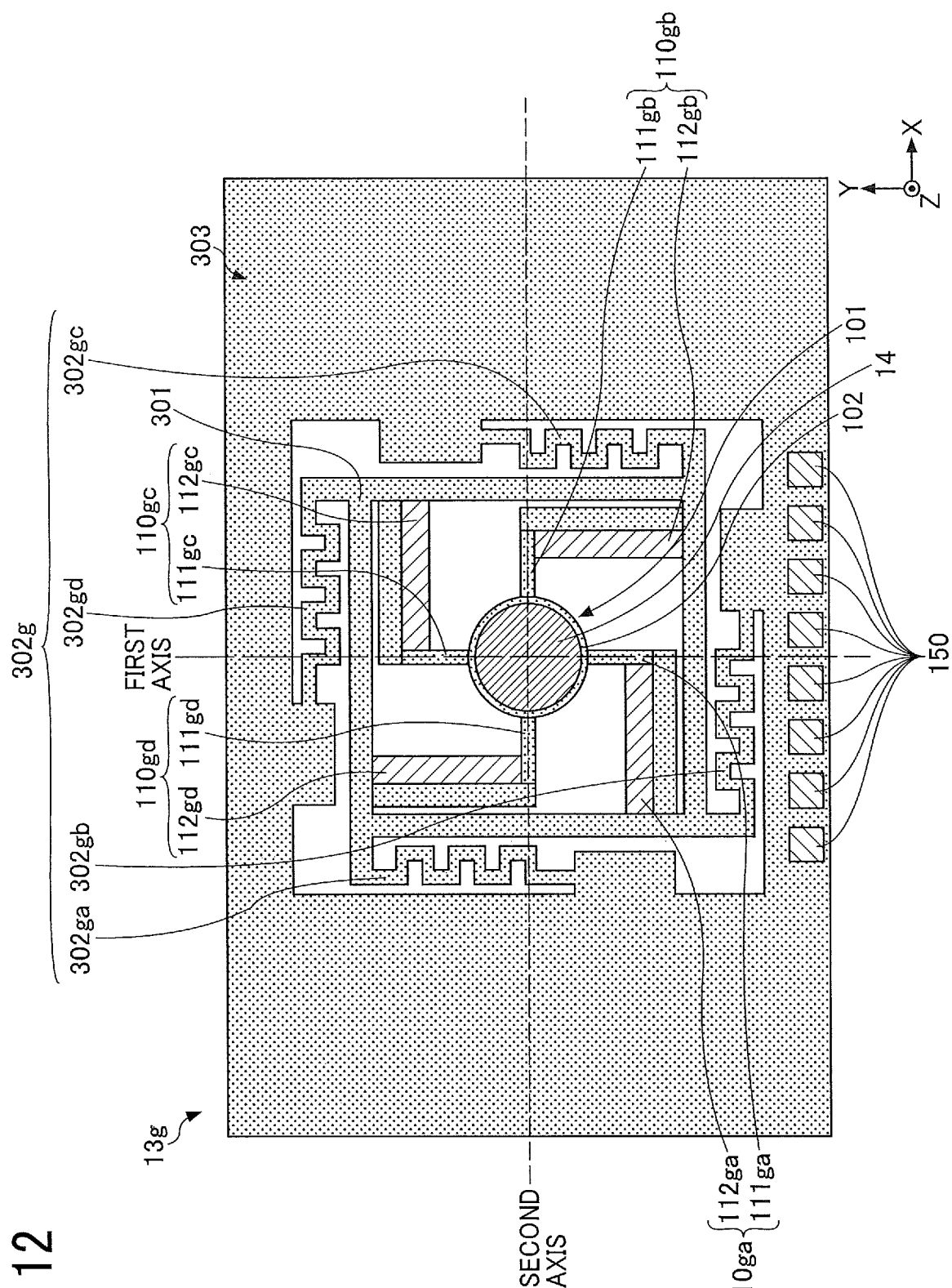
FIG. 12 is a plan view of a movable device according to a third embodiment.

FIG. 12 is a plan view of the movable device 13g. The movable device 13g in FIG. has a connecting portion 302g and drive units 110ga, 110gb, 110gc, and 110gd. The connecting portion 302g includes a first connecting portion 302ga, a second connecting portion 302gb, a third connecting portion 302gc, and a fourth connecting portion 302gd.

One end of each of the first connecting portion 302ga, the second connecting portion 302gb, the third connecting portion 302gc, and the fourth connecting portion 302gd is connected to the support 301. The other end of each of the first connecting portion 302ga, the second connecting portion 302gb, the third connecting portion 302gc, and the fourth connecting portion 302gd is connected to the stationary support 303. These first connecting portion 302ga, the second connecting portion 302gb, the third connecting portion 302gc, and the fourth connecting portion 302gd are arranged substantially point-symmetrical with respect to the center of the reflecting surface 14.

One end of each of the drive units 110ga, 110gb, and 110gc is connected to the mirror 101, and the other end of each of the drive units 110ga, 110gb, and 110gc is connected to the support 301. These first connecting portion 302ga, the second connecting portion 302gb, the third connecting portion 302gc, and the fourth connecting portion 302gd are arranged substantially point-symmetrical with respect to the center of the reflecting surface 14.

As described above, the same effects as those described in the first and second embodiments can be obtained even in the movable device 13g having the four drive units 110ga, 110gb, and 110gc arranged to be substantially point-symmetrical with respect to the center of the reflecting surface 14.

Fourth Embodiment

Next, a movable device 13h according to the fifth embodiment will be described.

Figure 13:
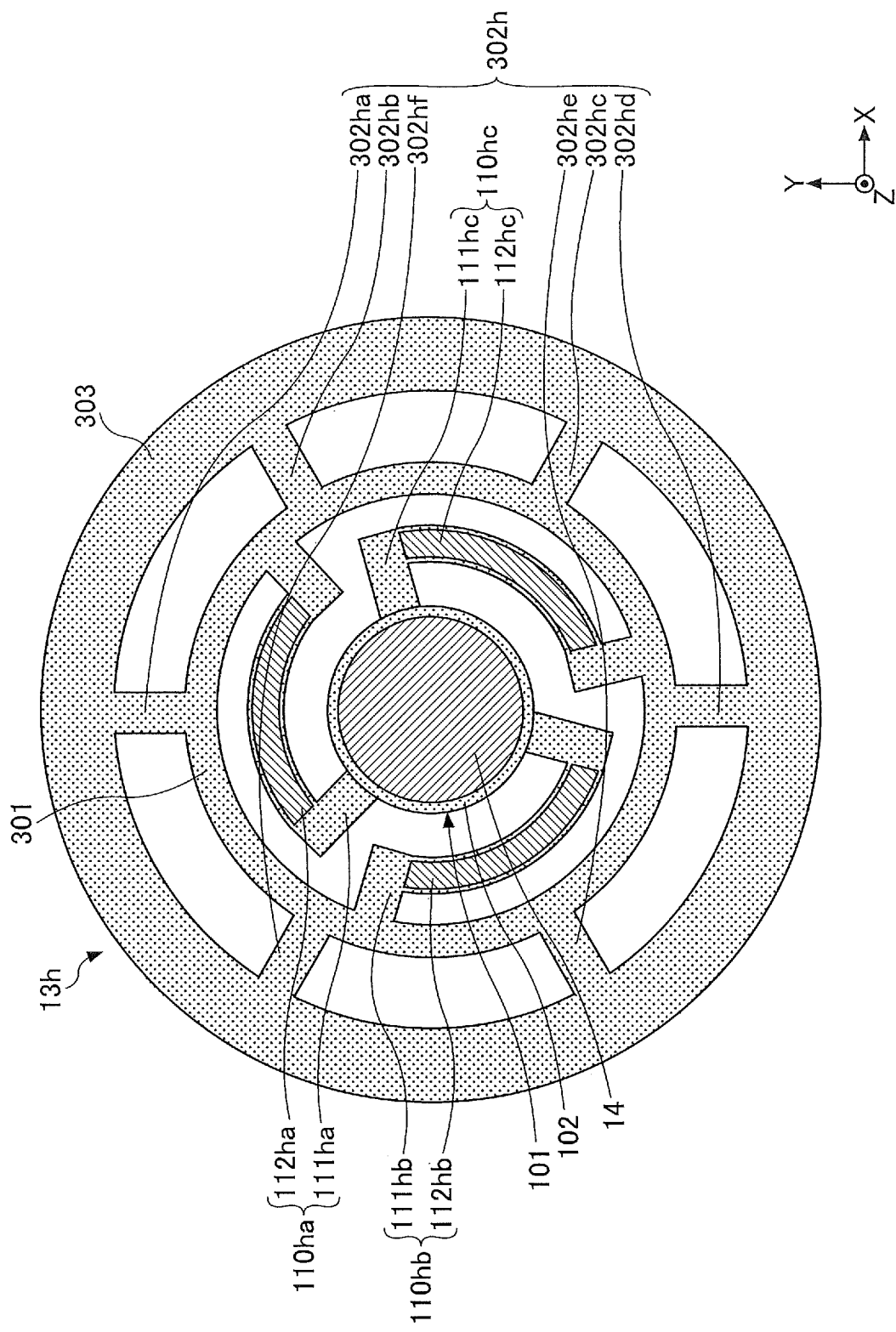
FIG. 13 is a plan view of a movable device according to a fourth embodiment.

FIG. 13 is a plan view of the movable device 13h. The movable device 13h in FIG. has a connecting portion 302h and drive units 110ha, 110hb, and 110hc. The connecting portion 302h includes a first connecting portion 302ha, a second connecting portion 302hb, a third connecting portion 302*hc*, a fourth connecting portion 302*hd*, a fifth connecting portion 302*he*, and a sixth connecting portion 302*hf*.

One end of each of the first connecting portion 302*ha*, the second connecting portion 302*hb*, the third connecting portion 302*hc*, the fourth connecting portion 302*hd*, the fifth connecting portion 302*he*, and the sixth connecting portion 302*hf* is connected to the support 301. The other end of each of the first connecting portion 302*ha*, the second connecting portion 302*hb*, the third connecting portion 302*hc*, the fourth connecting portion 302*hd*, the fifth connecting portion 302*he*, and the sixth connecting portion 302*hf* is connected to the stationary support 303. The first connecting portion 302*ha*, the second connecting portion 302*hb*, the third connecting portion 302*hc*, the fourth connecting portion 302*hd*, the fifth connecting portion 302*he*, and the sixth connecting portion 302*hf* are arranged substantially point-symmetrical with respect to the center of the reflecting surface 14.

One end of each of the drive units 110*ha*, 110*hb*, and 110*hc* is connected to the mirror 101, and the other end of each of the drive units 110*ha*, 110*hb*, and 110*hc* is connected to the support 301. The first connecting portion 302*ha*, the second connecting portion 302*hb*, the third connecting portion 302*hc*, the fourth connecting portion 302*hd*, the fifth connecting portion 302*he*, and the sixth connecting portion 302*hf* are arranged substantially point-symmetrical with respect to the center of the reflecting surface 14.

As described above, the same effects as those described in the first and second embodiments can be obtained even in the movable device 13*h* having the three drive units 110*ha*, 110*hb*, and 110*hc* arranged to be substantially point-symmetrical with respect to the center of the reflecting surface 14.

The third embodiment includes four drive units, whereas the fourth embodiment includes three drive units. However, the number of drive units may be further increased.

Other Preferred Embodiments

The movable device 13 according to at least one embodiment may be incorporated in various systems and devices. The following describes application examples of the movable device 13 in various systems and devices.

Figure 14:
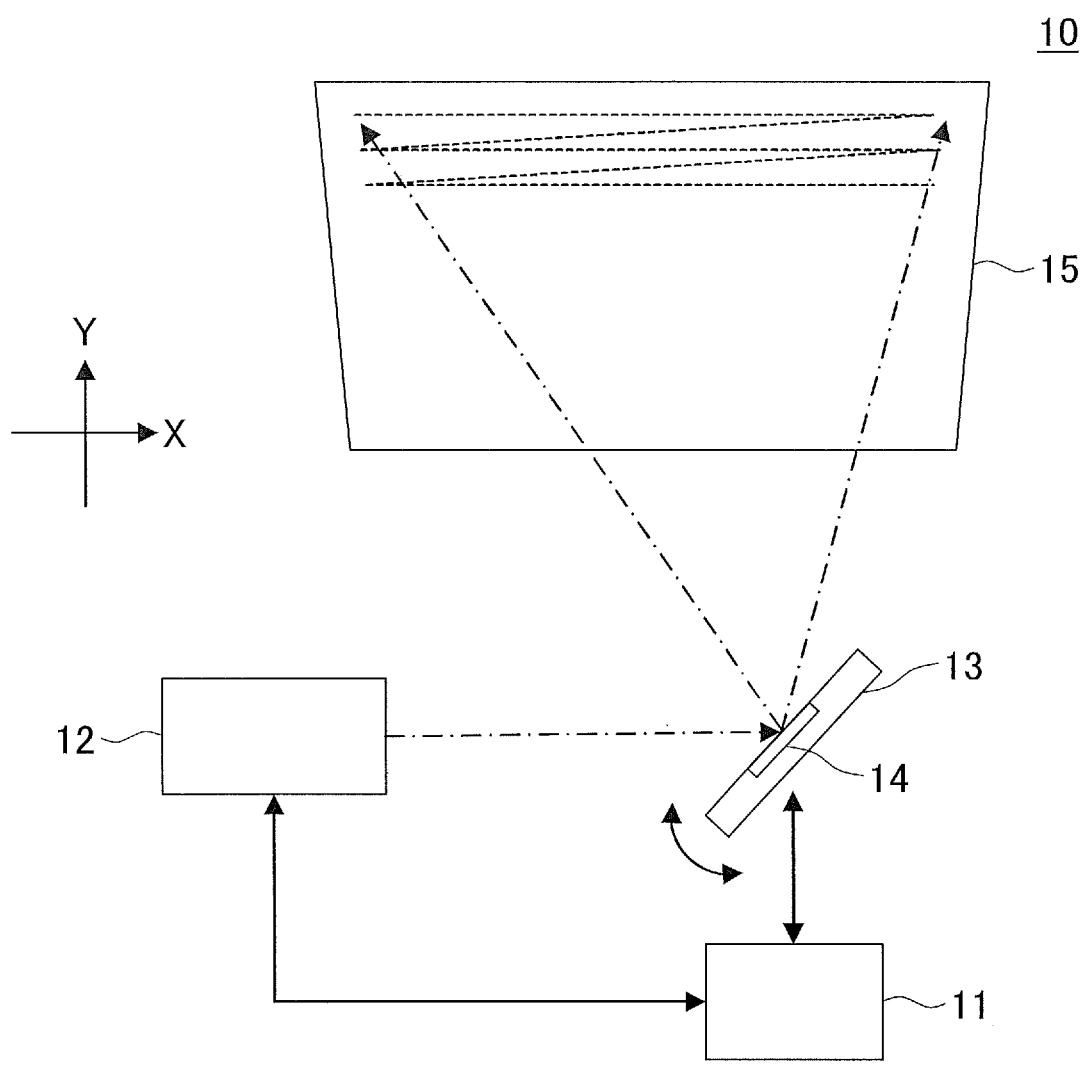
FIG. 14 is a schematic view of an optical scanning system according to an embodiment of the present disclosure.

With initially reference to FIGS. 14 to 17, an optical scanning system incorporating a movable device according to an embodiment is described below in detail. FIG. 14 is a schematic view of an example of an optical scanning system 10. As illustrated in FIG. 14, the optical scanning system 10 deflects light emitted from a light-source device 12 under control of a control device 11, by using a reflecting surface 14 included in the movable device 13, so as to optically scan a target surface 15 to be scanned (hereinafter, referred to as target surface).

The optical scanning system 10 includes the control device 11, the light-source device 12, and the movable device 13 including the reflecting surface 14.

For example, the control device 11 is an electronic circuit unit provided with a central processing unit (CPU) and a field-programmable gate array (FPGA). The movable device 13 is, for example, a MEMS device provided with a movable reflecting surface 14.

The light-source device 12 is, for example, a laser device that emits a laser beam. The surface 15 to be scanned is, for example, a screen.

The control device 11 generates control instructions of the light-source device 12 and the movable device 13 using acquired optical-scanning information, and outputs drive signals to the light-source device 12 and the movable device 13 in accordance with the control instructions. The light-source device 12 emits light in accordance with the received drive signal. The movable device 13 moves the reflecting surface 14 in at least one of a uniaxial direction and a biaxial direction, in accordance with the received drive signal.

With this configuration, for example, the reflecting surface 14 of the movable device 13 is biaxially moved in a reciprocating manner within a predetermined range, and the light emitted from the light-source device 12 to be incident on the reflecting surface 14 is uniaxially deflected to perform optical scanning, under the control of the control device 11, which is based on image data that is an example of the optical-scanning information. Accordingly, an image can be projected onto the target surface 15 as desired. The details of the movable device of the present embodiment and the details of the control by the control device are described later.

Next, the hardware configuration of an example of the optical scanning system 10 is described referring to FIG. 15. FIG. 15 is a hardware block diagram of an example of the optical scanning system. As illustrated in FIG. 15, the optical scanning system 10 includes the control device 11, the light-source device 12, and the movable device 13, which are electrically connected to one another. The control device 11 includes a central processing unit (CPU) 20, a random access memory (RAM) 21, a read only memory (ROM) 22, a field-programmable gate array (FPGA) 23, an external interface (I/F) 24, a light-source driver 25, and a movable-device driver 26.

The CPU 20 is an arithmetic device that loads into the RAM 21 a program or data from a storage device such as the ROM 22 and executes processing to control the entirety of the control device 11.

The RAM 21 is a volatile storage device that temporarily stores a program and data.

The ROM 22 is a non-volatile storage device that stores a program or data even after the power is turned off, and stores a program or data for processing that is executed by the CPU 20 to control each function of the optical scanning system 10.

The FPGA 23 is a circuit that outputs proper control signals to the light-source driver and the movable-device driver 26 in accordance with the processing performed by the CPU 20.

For example, the external I/F 24 is an interface with respect to an external device or a network. The external device includes, for example, a host device such as a PC (Personal Computer), and a storage device such as a USB memory, an SD card, a CD, a DVD, an HDD, and an SSD. For example, the network may be a controller area network (CAN) of a vehicle, a local area network (LAN), and the Internet. The external I/F 24 can have any configuration that can achieve connection to an external device or communication with an external device. The external I/F 24 may be provided for each external device.

The light-source driver 25 is an electric circuit that outputs a drive signal such as a drive voltage to the light-source device 12 in accordance with the received control signal.

The movable-device driver 26 is an electric circuit that outputs a drive signal such as a drive voltage to the movable device 13 in accordance with the received control signal.

In the control device 11, the CPU 20 acquires optical-scanning information from an external device or the network through the external I/F 24. The CPU 20 may have any configuration that acquires optical scanning information. In some examples, the optical scanning information may be stored in the ROM 22 or in the FPGA 23 of the control device 11. In some other examples, a storage device such as a solid state disk (SSD) may be additionally provided in the control device 11 and the optical scanning information may be stored in the storage device.

In this case, the optical-scanning information indicates how the surface 15 is to be optically scanned. In another example, the optical-scanning information is image data used for optical scanning to display an image. For another example, the optical-scanning information is writing data indicating the order and portion of writing when optical writing is performed by optical scanning. Furthermore, for example, the optical scanning information is irradiation data indicating the timing and range of irradiation of light for object recognition by optical scanning.

The control device 11 has the hardware configuration in FIG. 15, and the components of the hardware configuration operate in accordance with instructions from the CPU 20 to implement the capabilities of the functional configuration as described below.

Next, the functional configuration of the control device 11 of the optical scanning system 10 is described below referring to FIG. 16. FIG. 16 is a functional block diagram of the control device 11 of the optical scanning system 10, according to an embodiment of the present disclosure.

As illustrated in FIG. 16, the control device 11 has the functions of a controller 30 and a driving-signal output unit 31.

The controller 30 is implemented by, for example, the CPU 20 and the FPGA 23. The controller 30 acquires optical-scanning information from an external device, converts the optical-scanning information into a control signal, and outputs the control signal to the drive-signal output unit 31. For example, the controller 30 acquires image data serving as the optical-scanning information from an external device or the like, generates a control signal from the image data through predetermined processing, and outputs the control signal to the drive-signal output unit 31. The drive-signal output unit 31 is implemented by, for example, the light-source driver 25 and the movable-device driver 26. The drive-signal output unit 31 outputs a drive signal to the light-source device 12 or the movable device 13 in accordance with the received control signal.

The drive signal is a signal for controlling the driving of the light-source device 12 or the movable device 13. For example, the drive signal of the light-source device 12 is a drive voltage used to control the irradiation timing and irradiation intensity of the light source. Moreover, for example, the drive signal in the movable device 13 is a drive voltage used to control the timing and range of motion where the reflecting surface 14 provided in the movable device 13 is moved.

Next, the process of optically scanning the target surface 15 performed by the optical scanning system 10 is described referring to FIG. 17. FIG. 17 is a flowchart of an example of processing performed by the optical scanning system 10.

In step S11, the controller 30 acquires optical-scanning information from, for example, an external device. In step S12, the controller 30 generates control signals from the acquired optical-scanning information, and outputs the control signals to the drive-signal output unit 31. In step S13, the drive-signal output unit 31 outputs drive signals to the light-source device 12 and the movable device 13 based on the received control signals. In step S14, the light-source device 12 emits light based on the received drive signal. In addition, the movable device 13 moves the reflecting surface 14 based on the received drive signal. The driving of the light-source device 12 and the movable device 13 causes light to be deflected in a given direction, and optical scanning is performed.

In the above-described optical scanning system 10, a single control device 11 has a device and a function for controlling the light-source device 12 and the movable device 13. However, a control device for the light-source device and a control device for the movable device may be separate elements.

In the above-described optical scanning system 10, a single control device 11 has the functions of the controller 30 and the functions of the drive-signal output unit 31 for the light-source device 12 and the movable device 13. These functions may be implemented by separate elements. For example, a drive-signal output device including a drive-signal output unit 31 may be provided in addition to the control device 11 including the controller 30. An optical deflection system that performs optical deflection may be configured by the control device 11 and the movable device 13 provided with the reflecting surface 14, which are elements of the above optical scanning system 10.

As described above, Incorporating the movable device 13 according to an embodiment into an optical scanning system enables the mirror 101 to stably rotate and also enables the optical scanning system to perform stable optical scanning.

An image projection apparatus incorporating a movable device according to at least one embodiment is described in detail with reference to FIGS. 18 and 19.

FIG. 18 is a schematic view of a vehicle 400 equipped with a HUD 500 as an example of an image projection device according to an embodiment. FIG. 19 is a schematic view of the HUD 500 according to an embodiment of the present disclosure. The vehicle 400 is an example of a mobile object.

The image projection apparatus is an apparatus that projects an image by optical scanning, and is, for example, a HUD.

As illustrated in FIG. 18, for example, the HUD 500 is disposed, for example, near a windshield 401 of the vehicle 400. Projection light L that is emitted from the HUD 500 is reflected by the windshield 401 and directed to a viewer (a driver 402) as a user. Accordingly, the driver 402 can visually recognize an image or the like projected by the HUD 500, as a virtual image. Alternatively, a combiner may be disposed on the inner wall surface of the windshield 401 so that the user can visually recognize a virtual image formed by the projection light that is reflected by the combiner.

Figure 19:
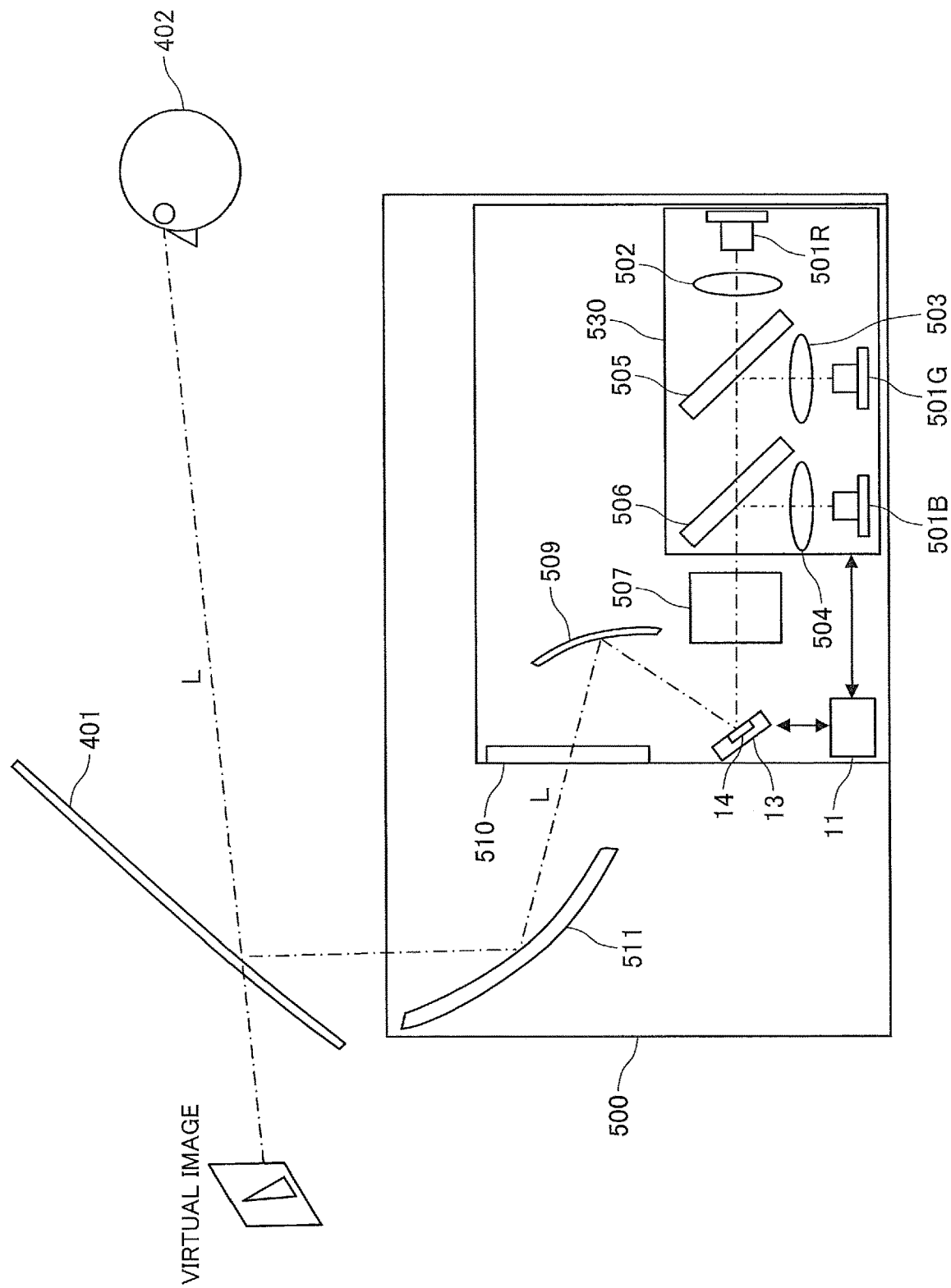
FIG. 19 is a schematic view of a HUD according to an embodiment of the present disclosure.

As illustrated in FIG. 19, the HUD 500 emits laser beams having different wavelengths from red, green, and blue laser-beam sources 501R, 501G, and 501B (multiple light sources of a light source unit of the HUD 500), respectively. The emitted laser beams pass through an incident optical system, and then are deflected by the movable device 13 including the reflecting surface 14. The incidence optical system includes collimator lenses 502, 503, and 504 respectively provided for the laser-beam sources 501R, 501G, and 501B, two dichroic mirrors 505 and 506, and a light-intensity adjuster 507. The deflected laser beams pass through a projection optical system and are projected onto a screen. The projection optical system (an optical system, of the image projection apparatus) includes a free-form surface mirror 509, an intermediate screen 510, and a projection mirror 511. In the HUD 500, the laser-beam sources 501R, 501G, 501B, the collimator lenses 502, 503, 504, and the dichroic mirrors 505, 506 are combined as a single unit that is an optical housing serving as a light source unit 530 (a light source unit of the HUD 500).

The HUD 500 projects an intermediate image displayed on the intermediate screen onto the windshield 401 of the vehicle 400 to allow the driver 402 to visually recognize the intermediate image as a virtual image.

The laser beams of RGB colors emitted from the laser-beam sources 501R, 501G, and 501B are collimated by the collimator lenses 502, 503, and 504 into approximately parallel beams, and are combined by the two dichroic mirrors 505 and 506. Each of the dichroic mirrors 505 and 506 is an example of a combiner. The light intensity of the combined laser beams is adjusted by the light-intensity adjuster 507, and then two-dimensional scanning is performed by the movable device 13 provided with the reflecting surface 14. The light L being deflected for two-dimensional scanning by the movable device 13 is reflected by the free-form surface mirror 509 and has its distortion corrected, thus being condensed on the intermediate screen 510. The intermediate screen 510 includes a microlens array in which multiple microlenses are two-dimensionally arranged, and enlarges the projection light L incident on the intermediate screen 510 in units of microlens.

The movable device 13 moves the reflecting surface 14 biaxially in a reciprocating manner to perform two-dimensional scanning with the projection light L incident on the reflecting surface 14. The movable device 13 is controlled in synchronization with the light-emitting timing of the laser-beam sources 501R, 501G, and 501B.

In the above description, the heads-up display 500 is described as an example of the image projection apparatus. However, no limitation is indicated thereby, and the image projection apparatus may be any apparatus that performs optical scanning, using the movable device 13 provided with the reflecting surface 14, to project an image. For example, the present disclosure is also applicable to a projector that is placed on a desk or the like and projects an image on a display screen, a head-mounted display device that is incorporated in a wearable member on the head of the observer, for example, and that projects an image on a reflective-and-transmissive screen of the wearable member or on an eyeball as a screen, and the like.

The image projection device may be incorporated in, not only the vehicle or the wearable member, but also, for example, a mobile object such as an aircraft, a ship, or a mobile robot; or an immobile object such as an operation robot that operates a driving target such as a manipulator without moving from the installed location.

As described above, incorporating the movable device 13 according to an embodiment into an image projection apparatus enables the mirror 101 to stably rotate and also enables the image projection apparatus to perform stable optical scanning.

Next, an optical writing device incorporating the movable device 13 according to an embodiment of the present disclosure is described in detail with reference to FIGS. 20 and 21.

Figure 20:
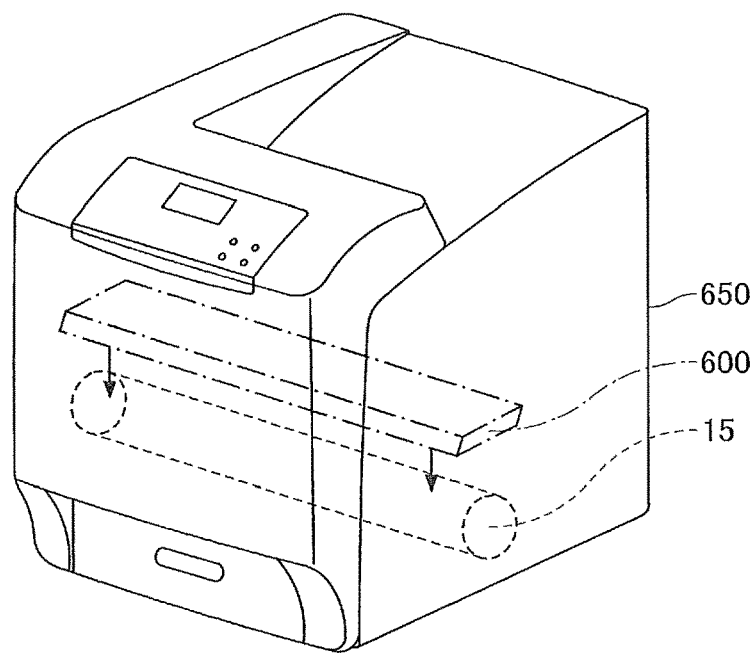
FIG. 20 is a schematic view of an example of an image forming apparatus equipped with an optical writing device.

FIG. 20 is an illustration of an example of an image forming apparatus equipped with the optical writing device 600. FIG. 21 is a schematic view of an example of the optical writing device 600.

As illustrated in FIG. 20, the optical writing device 600 is used as a component of an image forming apparatus typified by a laser printer 650, for example, having printer functions using laser beams. In the image forming apparatus, the optical writing device 600 performs optical scanning on a photoconductor drum, which is the target surface 15, by using one or more laser beams, thereby performing optical writing on the photoconductor drum.

Figure 21:
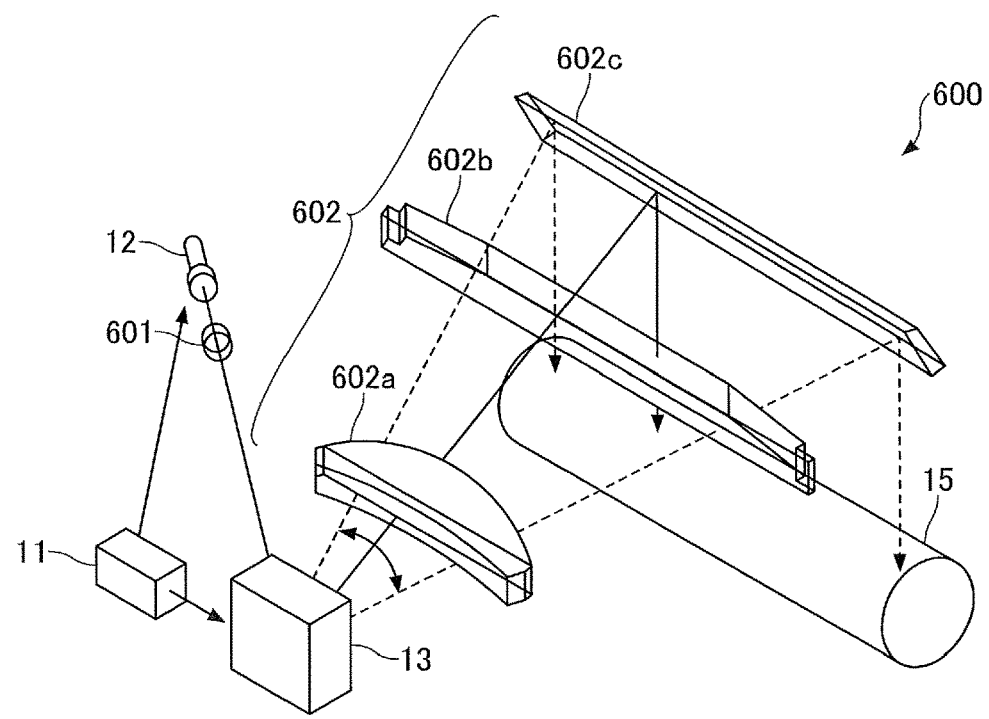
FIG. 21 is a schematic view of an example of the optical writing device.

As illustrated in FIG. 21, in the optical writing device 600, a laser beam from the light-source device 12 such as a laser element passes through an image forming optical system 601 such as a collimator lens and is then deflected uniaxially or biaxially by the movable device 13 having the reflecting surface 14. The laser beam deflected by the movable device 13 passes through a scanning optical system 602 constituted by a first lens 602a, a second lens 602b, and a reflecting mirror unit 602c, and is emitted onto the target surface 15 (e.g., a photoconductor drum or photosensitive paper), and thereby optical writing is performed. The scanning optical system 602 forms a laser beam in the form of a spot on the target surface 15. The light-source device 12 and the movable device 13 including the reflecting surface 14 are controlled by the control device 11.

As described above, the optical writing device 600 can be used as a component of the image forming apparatus having a printer function using laser beams. Moreover, by employing another scanning optical system to perform scanning in a biaxial manner in addition to the uniaxial manner, the optical writing device 600 can also be used as a component of an image forming apparatus such as a laser label apparatus that deflects laser beams to perform optical scanning on thermal media and print letters by heating.

The movable device 13 including the reflecting surface 14 to be applied to the optical writing device saves power of the optical writing device because power consumption for driving the movable device 13 is less than that for driving a rotational polygon mirror. The movable device 13 makes a smaller wind noise when the mirror substrate oscillates compared with a rotational polygon mirror, and thus is advantageous in achieving low noise of the optical writing device. The optical writing device requires much smaller installation space than the installation space of a rotational polygon mirror, and the amount of heat generated by the movable device 13 is small. Accordingly, downsizing is easily achieved, and thus the optical writing device is advantageous in downsizing the image forming apparatus.

As described above, incorporating the movable device 13 according to an embodiment into an optical writing device enables the mirror 101 to stably rotate and also enables the optical writing device to perform stable optical scanning.

Figure 22:
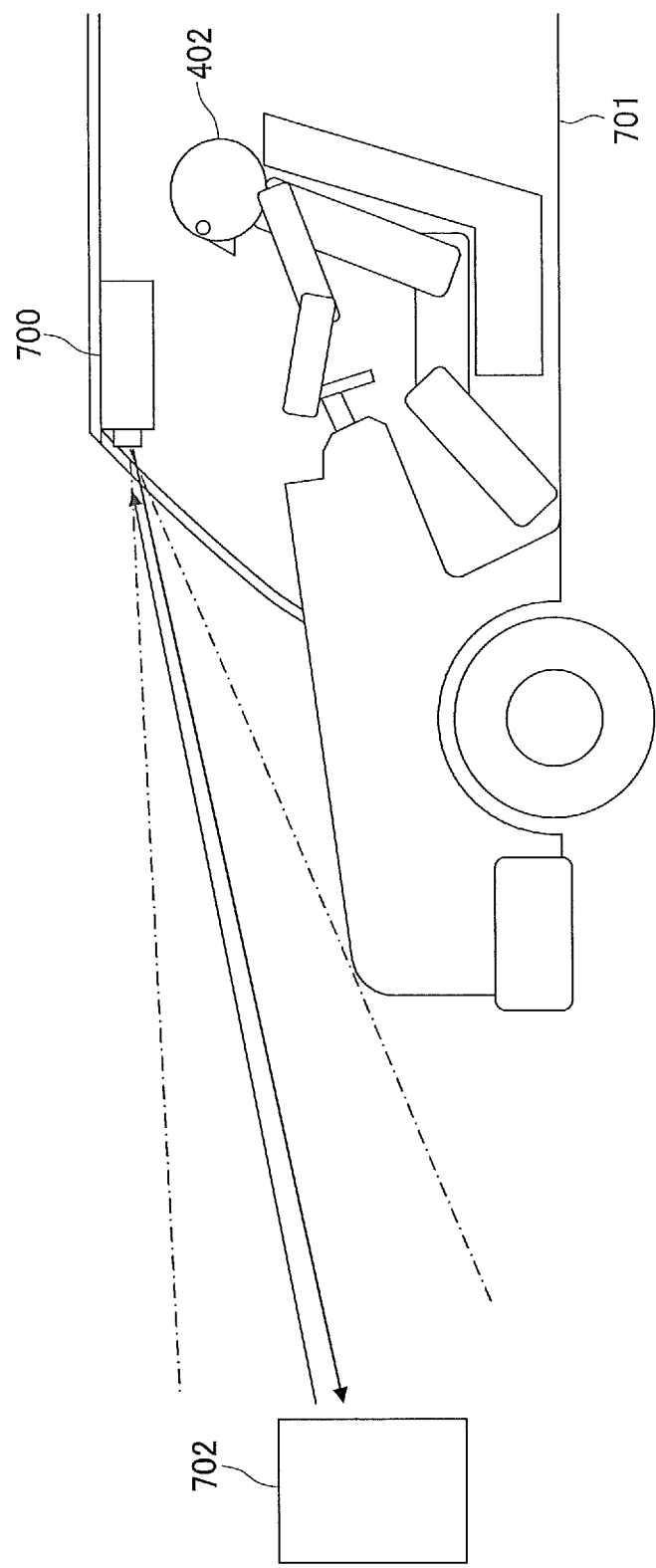
FIG. 22 is a schematic view of a motor vehicle mounted with a light detection and ranging (LiDAR) device.
Figure 23:
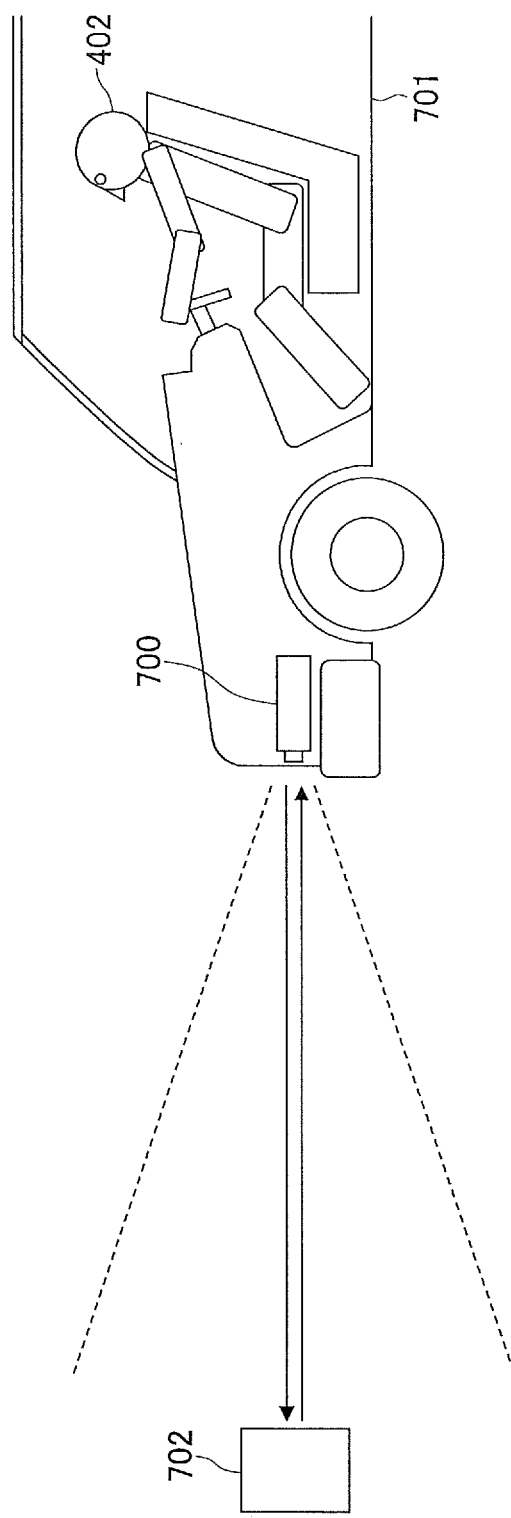
FIG. 23 is a schematic view of another example of an automobile on which LiDAR device is mounted.
Figure 24:
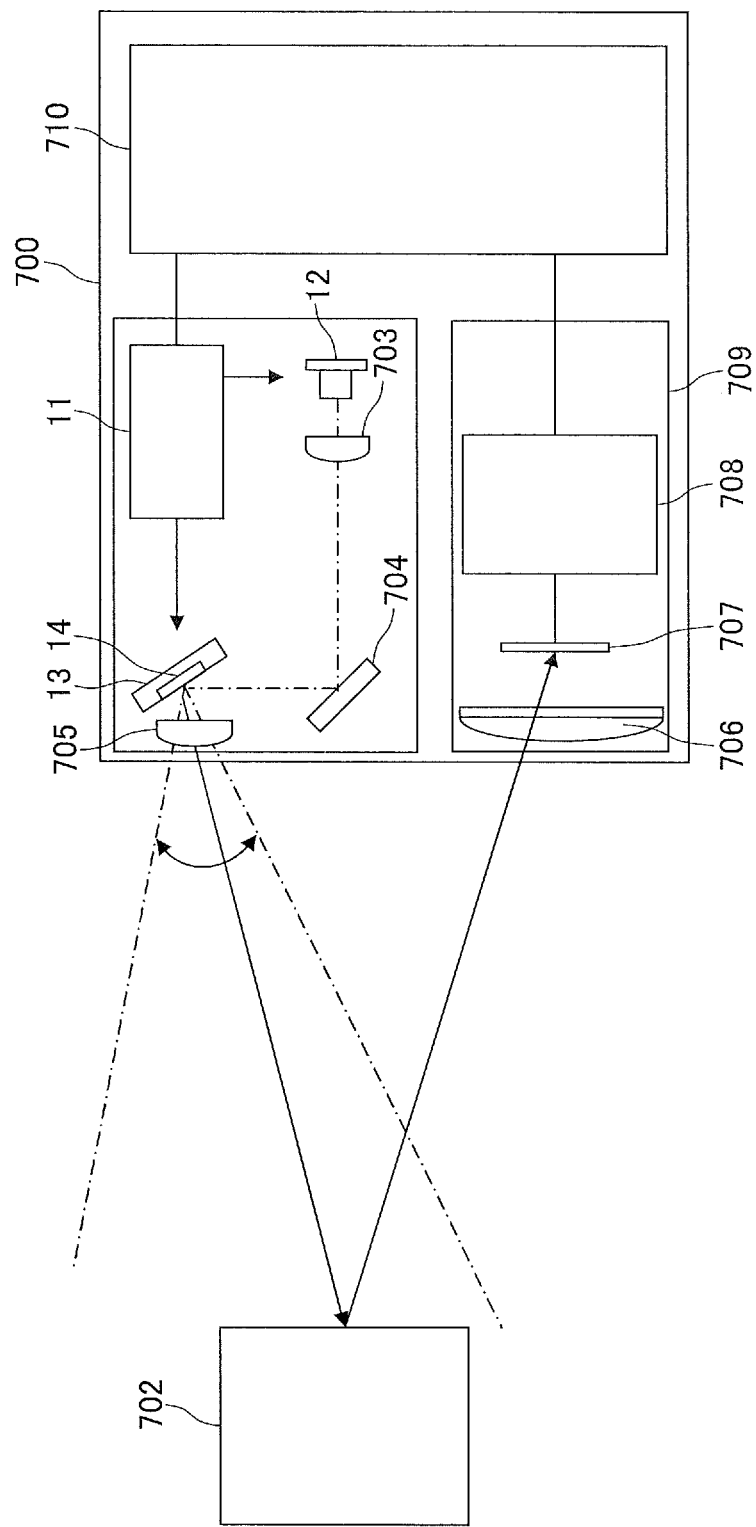
FIG. 24 is a schematic view of the LiDAR device according to an embodiment of the present disclosure.

Next, a distance measuring apparatus incorporating the movable device according to an embodiment is described in detail referring to FIGS. 22 to 24.

FIGS. 22 and 23 is a schematic view of a vehicle mounted with a LiDAR device, which is an example of a distance measurement apparatus, in a lamp unit on which a headlamp of the vehicle is mounted. FIG. 24 is a schematic view of an example of the LiDAR device.

The distance measurement apparatus, which is, for example, a LiDAR device, measures a distance in a direction to the target object, or a target direction.

As illustrated in FIGS. 22 and 23, for example, a LiDAR device 700 is mounted on a vehicle 701 to perform optical scanning in a target direction and receive the light reflected from an object 702 that exists in the target direction. Accordingly, the LiDAR device 700 measures a distance to the object 702. The vehicle 701 is an example of a mobile object.

As illustrated in FIG. 24, the laser beams emitted from a light-source device 12 pass through an incident optical system, and then are caused to perform scanning uniaxially or biaxially using the movable device 13 including the reflecting surface 14. The incidence optical system includes a collimator lens 703 that serves as an optical system that collimates divergent beams into approximately parallel beams, and a planar mirror 704. The parallel beams are emitted to the object 702 ahead of the device, as passing through, for example, a projection lens 705 that serves as a projection optical system. The driving of the light-source device 12 and the movable device 13 is controlled by the control device 11. The light reflected by the object 702 is detected by a photosensor 709. More specifically, the reflected light passes through, for example, a condenser lens 706 that serves as an incident-light receiving and detecting optical system, and is received by an image sensor 707. Then, the image sensor 707 outputs a detected signal to a signal processing device 708. The signal processing device 708 performs predetermined processing on the received detected signal, such as binarization or noise processing, and outputs the result to a distance measuring circuit 710.

The distance measuring circuit 710 determines whether the object 702 is present based on the time difference between the timing at which the light-source device 12 emits laser beams and the timing at which the photosensor 709 receives the laser beams or the phase difference per pixel of the image sensor 707 that have received the laser beams. Moreover, the distance measuring circuit 710 calculates distance information indicating the distance from the object 702.

The movable device 13 including the reflecting surface 14 is less likely broken and is compact compared with a polygon mirror, and thus, a highly durable and compact LiDAR device can be provided. Such a LiDAR device is attached to, for example, a vehicle, an aircraft, a ship, a robot, or the like, and can perform optical scanning within a predetermined range to determine whether an obstacle is present or absent to measure the distance from the obstacle.

In the present embodiment, the LiDAR device 700 is described as an example of the distance measurement apparatus. However, no limitation is intended thereby. The distance measurement apparatus may be any apparatus that performs optical scanning by controlling the movable device 13 provided with the reflecting surface 14, using the control device 11, and that receives the receives the reflected laser beam using a photodetector to measure the distance to the object 702.

For example, the present disclosure is also applicable to a biometric authentication apparatus, a security sensor, or a component of a three-dimensional scanner, for example. The biometric authentication apparatus performs optical scanning on a hand or face to obtain distance information, calculates object information such as the shape of the object based on the distance information, and refers to records to recognize the object. The security sensor performs optical scanning in a target range to recognize an incoming object. The three-dimensional scanner performs optical scanning to obtain distance information, calculates object information such as the shape of the object based on the distance information to recognize the object, and outputs the object information in the form of three-dimensional data.

As described above, incorporating the movable device 13 according to an embodiment into a distance measurement apparatus enables the mirror 101 to stably rotate and also enables the distance measurement apparatus to perform stable optical scanning.

Figure 25:
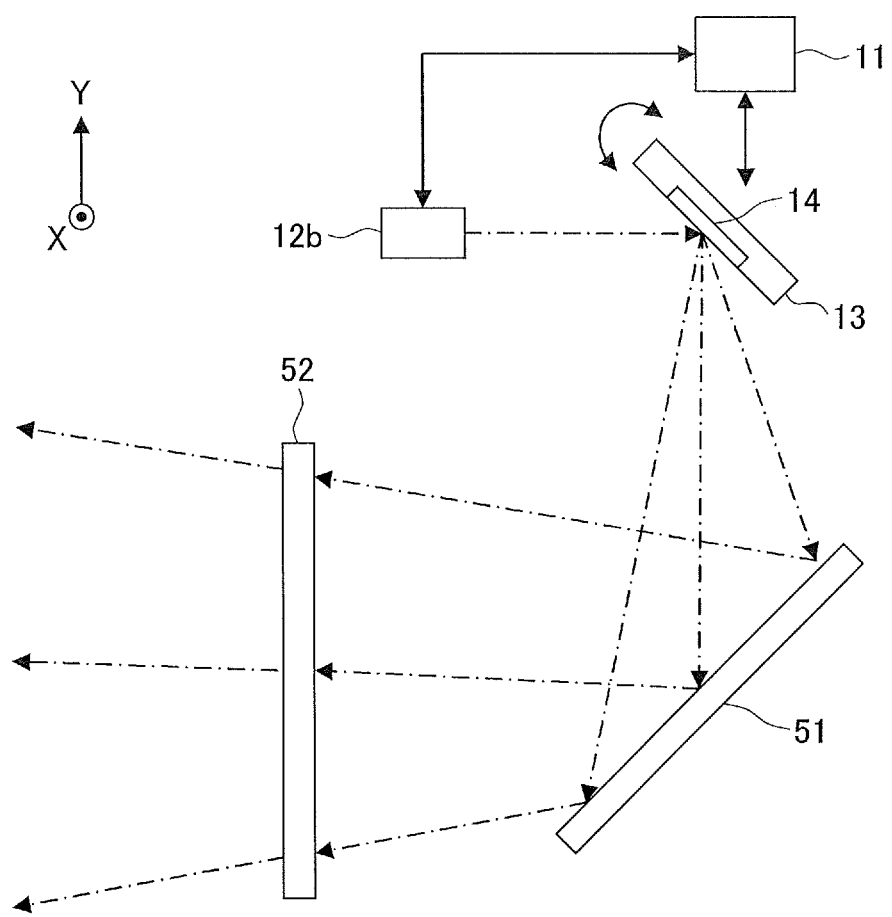
FIG. 25 is a schematic view of an example of a configuration of a laser headlamp.

Next, a laser headlamp 50 in which the movable device according to the present embodiment is applied to a headlight of a car is described with reference to FIG. 25. FIG. 25 is an illustration of the configuration of a laser headlamp 50 according to an embodiment of the present disclosure.

The laser headlamp 50 includes a control device 11, a light-source device 12b, a movable device 13 including a reflecting surface 14, a mirror 51, and a transparent plate 52.

The light-source device 12b is a light source that emits blue laser beams. The laser beams emitted from the light-source device 12b are incident on the movable device 13 and are reflected by the reflecting surface 14. The movable device 13 moves the reflecting surface 14 in the XY-direction in accordance with signals from the control device 11, and performs two-dimensional scanning using the blue laser beam emitted from the light-source device 12b in the XY-direction.

The scanning light of the movable device 13 is reflected by the mirror 51, and is incident on the transparent plate 52. The transparent plate 52 is coated with a yellow phosphor on the front surface or the back surface. The blue laser beams that are reflected by the mirror 51 are converted into white light whose color is within the range of the statutory color for a headlight as passing through the yellow phosphor (fluorescent material) of the transparent plate 52. Thereby, the front of the automobile is illuminated with white light from the transparent plate 52.

The scanning light of the movable device 13 scatters in a predetermined manner as passing through the fluorescent material of the transparent plate 52. Accordingly, glare is attenuated at an illuminated target in the area ahead of the vehicle.

When the movable device 13 is applied to a headlight of a vehicle, the color of light beams from the light-source device 12b and the color of the phosphor are not limited to blue and yellow, respectively. For example, the light-source device 12b may emit near-ultraviolet light, and the transparent plate 52 may be coated with homogenized mixture of a plurality of kinds of fluorescent materials of red-green-blue (RGB) trichromatic colors. In this case as well, the light passing through the transparent plate 52 can be converted into white light, and the front of the vehicle can be illuminated with white light.

As described above, incorporating the movable device 13 according to an embodiment into a laser headlamp enables the mirror 101 to stably rotate and also enables the laser headlamp to perform stable optical scanning.

Figure 26:
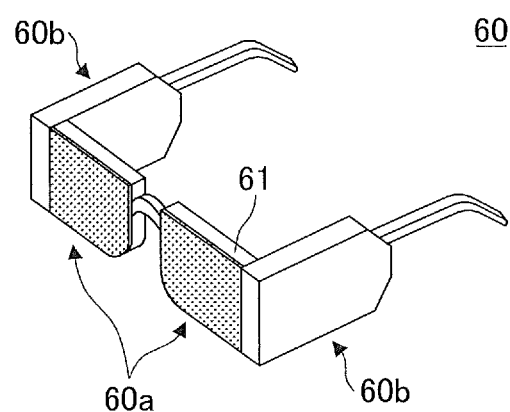
FIG. 26 is a perspective view of the external appearance of a head-mounted display (HMD) according to an embodiment of the present disclosure.
Figure 27:
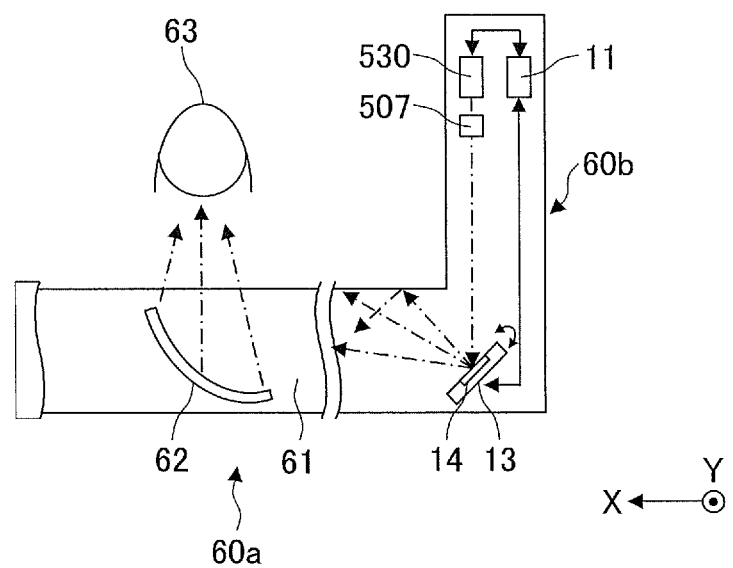
FIG. 27 is an illustration of a part of the configuration of the HMD in FIG. 26.

Next, a head-mounted display (HMD) 60 incorporating the movable device 13 according to an embodiment is described referring to FIGS. 26 and 27. Note that the HMD is a head-mounted display that can be mounted on a human head, and can be shaped like, for example, glasses. In the following description, such a head-mounted display may be referred to simply as an HMD.

FIG. 26 is a perspective view of the appearance of the HMD 60. In FIG. 26, the HMD 60 includes a pair of front temples and a pair of temples, the pair of front temples and the pair of 60a temples being substantially symmetrical to each other on the right and left sides of the 60b. The front 60a can include, for example, a light guide plate 61. An optical system, a control device, and the like, can be incorporated in the temple 60b.

FIG. 27 is an illustration of a configuration of a part of the HMD 60. Although the configuration for the left eye is illustrated in FIG. 27, the HMD 60 has a configuration similar to that for the right eye.

The HMD 60 includes a control device 11, a light source unit 530, a light-intensity adjuster 507, a movable device 13 including a reflecting surface 14, a light guide plate 61, and a semi-reflective mirror 62.

The light source unit 530 includes, as described above, the laser-beam sources 501R, 501G, and 501B, the collimator lenses 502, 503, and 504, and the dichroic mirrors 505 and 506, and these elements are combined as a single unit in the optical housing. In the light source unit 530, the laser beams of the RGB colors that are emitted from the laser-beam sources 501R, 501G, and 501B are combined by the two dichroic mirrors 505 and 506. The combined parallel light is emitted from the light source unit 530.

The light intensity of the combined laser beams from the light source unit 530 is adjusted by the light-intensity adjuster 507. Then, the adjusted light is incident on the movable device 13. The movable device 13 moves the reflecting surface 14 in the XY-direction based on the signal from the control device 11, and performs two-dimensional scanning with the light emitted from the light source unit 530. The driving of the movable device 13 is controlled in synchronization with the light emission timings of the laser-beam sources 501R, 501G, and 501B, and a color image is formed with the scanning light.

The scanning light of the movable device 13 is incident on the light guide plate 61. The light guide plate 61 reflects the scanning light on the inner wall and guides the scanning light to the semi-reflective mirror 62. The light guide plate 61 is formed by, for example, resin that has transparency to the wavelength of the scanning light.

The semi-reflective mirror 62 reflects the light that is guided through the light guide plate 61 to the rear side of the HMD 60, and the reflected light exits towards an eye of a wearer 63 of the HMD 60. The semi-reflective mirror 62 has, for example, a free-form surface shape. An image formed of the scanning light is reflected by the semi-reflective mirror 62, thus being formed on the retina of wearer 63. Alternatively, the reflection at the semi-reflective mirror 62 and the effect of the crystalline lenses of eyeballs causes the image of the scanning light to be formed on the retina of the wearer 63. Moreover, due to the reflection at the semi-reflective mirror 62, the spatial distortion of the image is corrected. The wearer 63 can observe an image formed by the light of scanning in the XY direction.

The wearer 63 observes an image of external light superposed on the image of the scanning light because of the semi-reflective mirror 62. The semi-reflective mirror 62 may be replaced with a mirror to exclude the extraneous light. In such a configuration, only the image that is formed by scanning light can be observed.

As described above, the HMD incorporating the movable device 13 according to at least one embodiment achieves a stable rotation of the mirror 101 and a stable optical scanning performance.

Figure 28:
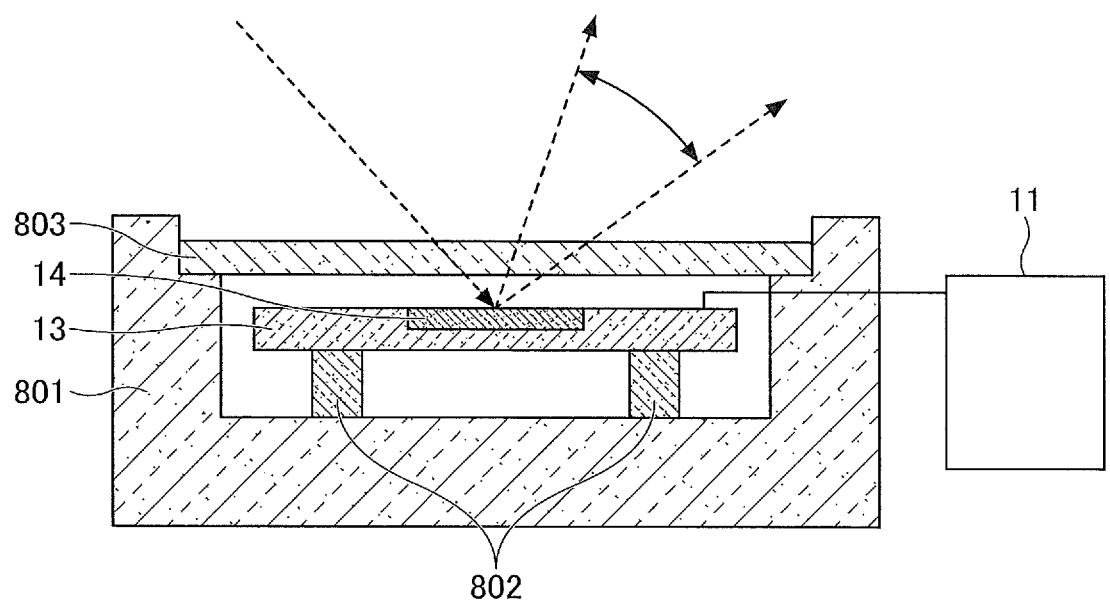
FIG. 28 is a schematic view of an example of a packaged movable device.

Next, packaging of the movable device 13 according to the embodiment is described referring to FIG. 28.

FIG. 28 is a schematic view of an example of a packaged movable device 13.

As illustrated in FIG. 28, the movable device 13 is mounted on a mounting component 802 inside the package 801, and is hermetically sealed and packaged as a part of the package 801 is covered with a light transmission member 803. The package contains inert gas such as nitrogen and is sealed. This configuration can substantially prevent the deterioration of the movable device 13 due to oxidation, and increase the durability against changes in environment such as temperature.

Although the embodiments of the present disclosure have been described above, the present disclosure is not limited to such specific embodiments, and various modifications and changes can be made without departing from the spirit and scope of the present disclosure as set forth in the appended claims.

In the above-described embodiments, the movable portion includes the reflecting surface. However, no limitation is intended thereby, and the movable portion may include another optical element such as a diffraction grating, a photodiode, a heater (for example, a heater using SiN), and a light source (for example, a surface-emitting laser), or may include both the reflecting surface and another optical element.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A movable device comprising:
a movable portion including a reflecting surface;
a drive unit having one end connected to the movable portion to rotate the movable portion;
a support supporting the drive unit and surrounding the reflecting surface;
a connecting portion having one end connected to the support to support the support; and
a stationary support to which the other end of the connecting portion is connected, said stationary support surrounding the support,
wherein the connecting portion connects the support and the stationary support, and
wherein the connecting portion connects the stationary support at a connecting part that is positioned in one radial direction relative to an axis of rotation of the movable portion.

2. The movable device according to claim 1, wherein a connecting region where the one end of the connecting portion is connected to the support is not included in a region extending from the drive unit in a direction the drive unit extend to the support.

3. The movable device according to claim 1, wherein the other end of the connecting portion is connected to the stationary support in a direction intersecting with an axis of rotation by the drive unit.

4. The movable device according to claim 1, wherein the connecting portion extends in a direction intersecting with an axis of rotation by the drive unit, to have the other end connected to the stationary support.

5. The movable device according to claim 1, further comprising:
a movable frame; and
a frame drive unit having one end connected to the movable frame and the other end connected to the stationary support to rotate the movable frame to rotate, wherein the connecting portion has the one end connected to the support and the other end connected to the movable frame.

6. The movable device according to claim 5, wherein the connecting portion extends in a direction intersecting with an axis of rotation by the frame drive unit to have the other end connected to the movable frame.

7. The movable device according to claim 5, wherein a resonance frequency of the connecting portion is higher than a resonance frequency of the frame drive unit.

8. The movable device according to claim 1, wherein a resonance frequency of the connecting portion is lower than a resonance frequency of the drive unit.

9. The movable device according to claim 1, wherein the connecting portion includes an even number of two or more connecting portions to elastically support the support, and
wherein the drive unit is between the connecting portions along an axis of rotation by the drive unit.

10. The movable device according to claim 1, wherein the connecting portion has one of:
a bending intrinsic resonance mode to bend in a direction of rotation of the movable portion by the drive unit; and
a rotational twisting intrinsic resonance mode to rotationally twist in the direction of rotation of the movable portion by the drive unit.

11. The movable device according to claim 1, wherein the connecting portion has a turning structure.

12. The movable device according to claim 1, wherein the drive unit has a turning structure having the one end connected to the movable portion and the other end connected to the support.

13. An image projection apparatus comprising:
a light source unit to emit light;
the movable device according to claim 1 to deflect the light emitted from the light source unit; and
an optical system to form an image with the light deflected by the movable device to project the image.

14. The image projection apparatus according to claim 13, wherein the light source unit includes:
multiple light sources to emit light beams having different wavelengths; and
a combiner to combine the light beams emitted from the multiple light sources into one light beam to be deflected by the movable device and projected by the image projection apparatus.

15. A mobile object comprising the image projection apparatus according to claim 13.

16. A laser headlamp comprising:
a light source to emit light;
the movable device according to claim 1 to deflect the light emitted from the light source; and
a transparent plate having a surface covered with fluorescent material, the transparent plate to transmit the light deflected by the movable device to convert the light transmitted through the transparent plate into white light and allow the white light to be emitted therefrom.

17. A mobile object comprising the laser headlamp according to claim 16.

18. A head-mounted display comprising:
a light source to emit light;
the movable device according to claim 1 to deflect the light emitted from the light source; and
a light guide plate to guide the light deflected by the movable device; and
a mirror to reflect the light guided by the light guide plate to eyes of a user wearing the head-mounted display to allow the user to observe an image formed with the light.

19. A distance measurement apparatus comprising:
a light source to emit light;
the movable device according to claim 1 to deflect the light emitted from the light source to irradiate an object with the deflected light;
a photosensor to receive light reflected from the object; and
circuitry to obtain output based on the received light from the photosensor and calculate a distance to the object based on the output.

20. A mobile object comprising the distance measurement apparatus according to claim 19.

* * * * *